(12) United States Patent
Nakamura et al.

(10) Patent No.: US 10,536,648 B2
(45) Date of Patent: Jan. 14, 2020

(54) MOVING IMAGE GENERATION SYSTEM THAT GENERATES ONE MOVING IMAGE BY COUPLING A PLURALITY OF MOVING IMAGES

(71) Applicant: CASIO COMPUTER CO., LTD., Shibuya-ku, Tokyo (JP)

(72) Inventors: Koki Nakamura, Saitama (JP); Hiroyoshi Ogawa, Tokyo (JP); Kazuma Kawahara, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 53 days.

(21) Appl. No.: 15/843,051

(22) Filed: Dec. 15, 2017

(65) Prior Publication Data
US 2018/0109737 A1 Apr. 19, 2018

Related U.S. Application Data

(62) Division of application No. 14/467,245, filed on Aug. 25, 2014, now Pat. No. 9,876,963.

(30) Foreign Application Priority Data
Sep. 3, 2013 (JP) ................................. 2013-182303

(51) Int. Cl.
*H04N 5/225* (2006.01)
*H04N 5/247* (2006.01)
(Continued)

(52) U.S. Cl.
CPC ............. *H04N 5/247* (2013.01); *H04N 5/225* (2013.01); *H04N 5/23229* (2013.01);
(Continued)

(58) Field of Classification Search
CPC . H04N 5/232; H04N 5/23218; H04N 5/23299
See application file for complete search history.

(56) References Cited

U.S. PATENT DOCUMENTS

| | | | |
|---|---|---|---|
| 9,171,351 | B2 | 10/2015 | Kita |
| 2004/0062525 | A1 | 4/2004 | Hasegawa et al. |

(Continued)

FOREIGN PATENT DOCUMENTS

| | | | |
|---|---|---|---|
| CN | 103002216 A | | 3/2013 |
| JP | 06325180 A | | 11/1994 |

(Continued)

OTHER PUBLICATIONS

Chinese Office Action (and English translation thereof) dated Apr. 13, 2017 issued in counterpart Chinese Patent Application No. 201410443249.X.

(Continued)

*Primary Examiner* — Twyler L Haskins
*Assistant Examiner* — Dwight Alex C Tejano
(74) *Attorney, Agent, or Firm* — Holtz, Holtz & Volek PC

(57) ABSTRACT

A moving image generation system includes a plurality of image capture apparatuses respectively having an image capture unit and a CPU. The CPU is configured to sequentially select an image capture apparatus of which photographing area includes a subject according to each timing in photography among the plurality of the image capture apparatus that is disposed so as to differentiate their photographing areas; detect the subject from a plurality of moving images acquired by performing the photography by the image capture unit sequentially selected; according to each timing in the photography, select a moving image including a subject-included area that is a partial image area in which the detected subject is included at a predetermined position or in a predetermined size, among the acquired plurality of (Continued)

moving images, and execute selective clipping processing that clips an image within the subject-included area from the moving images thus selected; and transmit each of the images that is selectively clipped according to each timing in the photography to an external apparatus.

17 Claims, 13 Drawing Sheets

(51) Int. Cl.
  *H04N 21/218* (2011.01)
  *H04N 5/232* (2006.01)
  *G06T 3/40* (2006.01)
  *H04N 7/18* (2006.01)
  *G11B 27/031* (2006.01)

(52) U.S. Cl.
  CPC ..... *H04N 21/21805* (2013.01); *G06T 3/4038* (2013.01); *G11B 27/031* (2013.01); *H04N 5/23206* (2013.01); *H04N 5/23238* (2013.01); *H04N 7/181* (2013.01)

(56) References Cited

U.S. PATENT DOCUMENTS

| | | | |
|---|---|---|---|
| 2007/0222858 A1* | 9/2007 | Sugimoto | G06K 9/00362 348/143 |
| 2008/0129825 A1* | 6/2008 | DeAngelis | A63B 24/0021 348/169 |
| 2009/0208062 A1 | 8/2009 | Sorek et al. | |
| 2011/0134240 A1* | 6/2011 | Anderson | H04W 4/02 348/143 |
| 2012/0105657 A1 | 5/2012 | Yokohata et al. | |
| 2012/0177200 A1 | 7/2012 | Harrison et al. | |
| 2013/0063485 A1 | 3/2013 | Kita | |
| 2014/0245367 A1 | 8/2014 | Sasaki et al. | |
| 2015/0085111 A1* | 3/2015 | Lavery | H04N 21/21805 348/143 |

FOREIGN PATENT DOCUMENTS

| | | |
|---|---|---|
| JP | 09179984 A | 7/1997 |
| JP | 2004159151 A | 6/2004 |
| JP | 2005109758 A | 4/2005 |
| JP | 2005252803 A | 9/2005 |
| JP | 2007266713 A | 10/2007 |
| JP | 2012004754 A | 1/2012 |
| JP | 2013123171 A | 6/2013 |

OTHER PUBLICATIONS

Japanese Office Action dated Jan. 27, 2015, issued in counterpart Japanese Application No. 2013-182303.

* cited by examiner

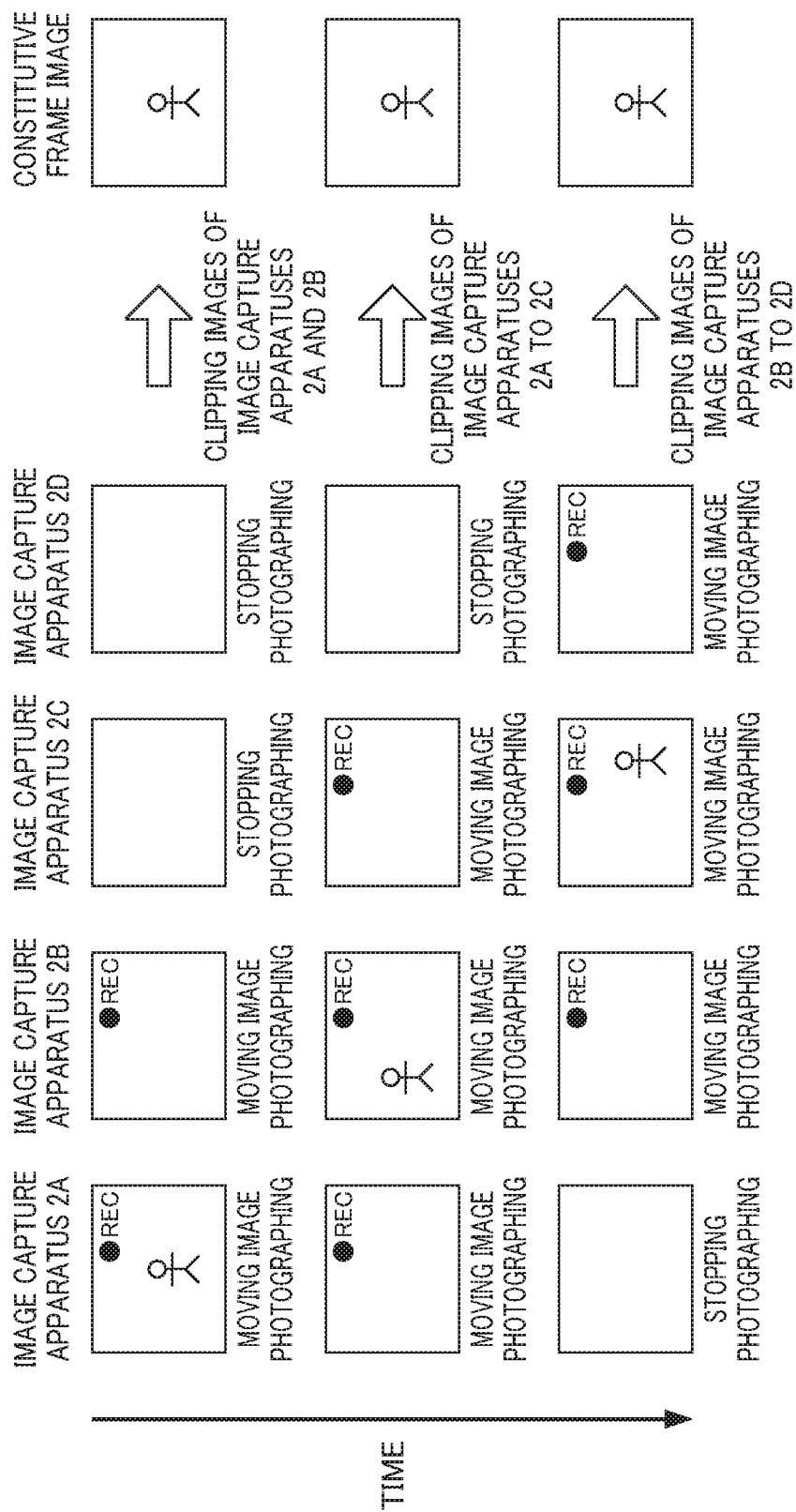

US 10,536,648 B2

MOVING IMAGE GENERATION SYSTEM THAT GENERATES ONE MOVING IMAGE BY COUPLING A PLURALITY OF MOVING IMAGES

This application is a Divisional application of U.S. Ser. No. 14/467,245, filed Aug. 25, 2014, which is based on and claims the benefit of priority from Japanese Patent Application No. 2013-182303, filed on Sep. 3, 2013, the contents of both of which is incorporated herein by reference.

BACKGROUND OF THE INVENTION

Field of the Invention

The present invention relates to a moving image generation system that generates one moving image by coupling a plurality of moving images, a moving image generation method, a program, and a storage medium.

Related Art

Conventionally, there has been a photographing technology in which a plurality of image capture apparatuses follows a movement of a subject and automatically captures moving images by switching the plurality of image capture apparatuses.

Regarding such a photographing technology, for example, Japanese Unexamined Patent Application No. 2005-109758 discloses a technology of using a plurality of moving image data sets acquired by continuously photographing a moving subject by a plurality of image capture apparatuses respectively placed so as to differentiate their photographing areas. The technology of Japanese Unexamined Patent Application No. 2005-109758 specifically discloses a technology of, for each timing during a subject being moved, selecting moving image data in which the subject is included; performing processing to generate images based on the moving image data thus selected; and sequentially coupling a plurality of images thus generated in accordance with each timing in the order of photographing times, thereby generating one moving image data set produced by continuously photographing the movement of the subject.

[Patent Document 1] Japanese Unexamined Patent Application, Publication No. 2005-109758

SUMMARY OF THE INVENTION

According to one aspect of the present invention, a moving image generation system includes a plurality of image capture apparatuses respectively having an image capture unit and a CPU, wherein the CPU is configured to: sequentially select an image capture apparatus of which photographing area includes a subject according to each timing in photography among the plurality of the image capture apparatus that is disposed so as to differentiate their photographing areas; detect the subject from a plurality of moving images acquired by performing the photography by the image capture unit sequentially selected; according to each timing in the photography, select a moving image including a subject-included area that is a partial image area in which the detected subject is included at a predetermined position or in a predetermined size, among the acquired plurality of moving images, and execute selective clipping processing that clips an image within the subject-included area from the moving images thus selected; and transmit each of the images that is selectively clipped according to each timing in the photography to an external apparatus.

According to another aspect of the present invention, a moving image generation method for a moving image generation system including a plurality of image capture apparatuses respectively having an image capture unit includes sequentially selecting an image capture apparatus of which photographing area includes a subject according to each timing in photography among the plurality of the image capture apparatus that is disposed so as to differentiate their photographing areas; detecting the subject from a plurality of moving images acquired by performing the photography by the image capture unit sequentially selected; according to each timing in the photography, selecting a moving image including a subject-included area that is a partial image area in which the detected subject is included at a predetermined position or in a predetermined size, among the acquired plurality of moving images, and execute selective clipping processing that clips an image within the subject-included area from the moving images thus selected; and transmitting each of the images that is selectively clipped according to each timing in the photography to an external apparatus.

According to still another aspect of the present invention, a non-transitory storage medium encoded with a computer-readable program that enables a computer controlling an image capture apparatus included in a moving image generation system having a plurality of image capture apparatus to execute functions including: sequentially selecting an image capture apparatus of which photographing area includes a subject according to each timing in photography among the plurality of the image capture apparatus that is disposed so as to differentiate their photographing areas; detecting the subject from a plurality of moving images acquired by performing the photography by the image capture unit sequentially selected; according to each timing in the photography, selecting a moving image including a subject-included area that is a partial image area in which the detected subject is included at a predetermined position or in a predetermined size, among the acquired plurality of moving images, and execute selective clipping processing that clips an image within the subject-included area from the moving images thus selected; and transmitting each of the images that is selectively clipped according to each timing in the photography to an external apparatus.

BRIEF DESCRIPTION OF THE DRAWINGS

FIG. 13 is a view showing another example of photography timing.

DETAILED DESCRIPTION OF THE INVENTION

Embodiments of the present invention are described below with reference to the drawings.

A subject tracking moving image generation system according to one embodiment of the present invention uses moving images (hereinafter, referred to as "photographed moving image") photographing a subject (hereinafter, referred to as "specific subject") moving in an angle of view of each image capture apparatus by way of a plurality of image capture apparatuses installed at predetermined positions, so as to generate moving image data (hereinafter, referred to as "subject tracking moving image") in which the specific subject constantly exists at a predetermined position (in the present embodiment, at the center position of the moving image) at a predetermined size (for example, the size in which the whole specific subject and a predetermined margin can also be provided around the specific subject). In the subject tracking moving image, the specific subject is constantly reflected at the center of the moving image. Therefore, the subject tracking moving image is configured to become a moving image in which a subject other than a specific subject such as a background can be viewed as if it is moving. In other words, the subject tracking moving image is configured to become a moving image that moves together with the specific subject.

First Embodiment

Figure 1:
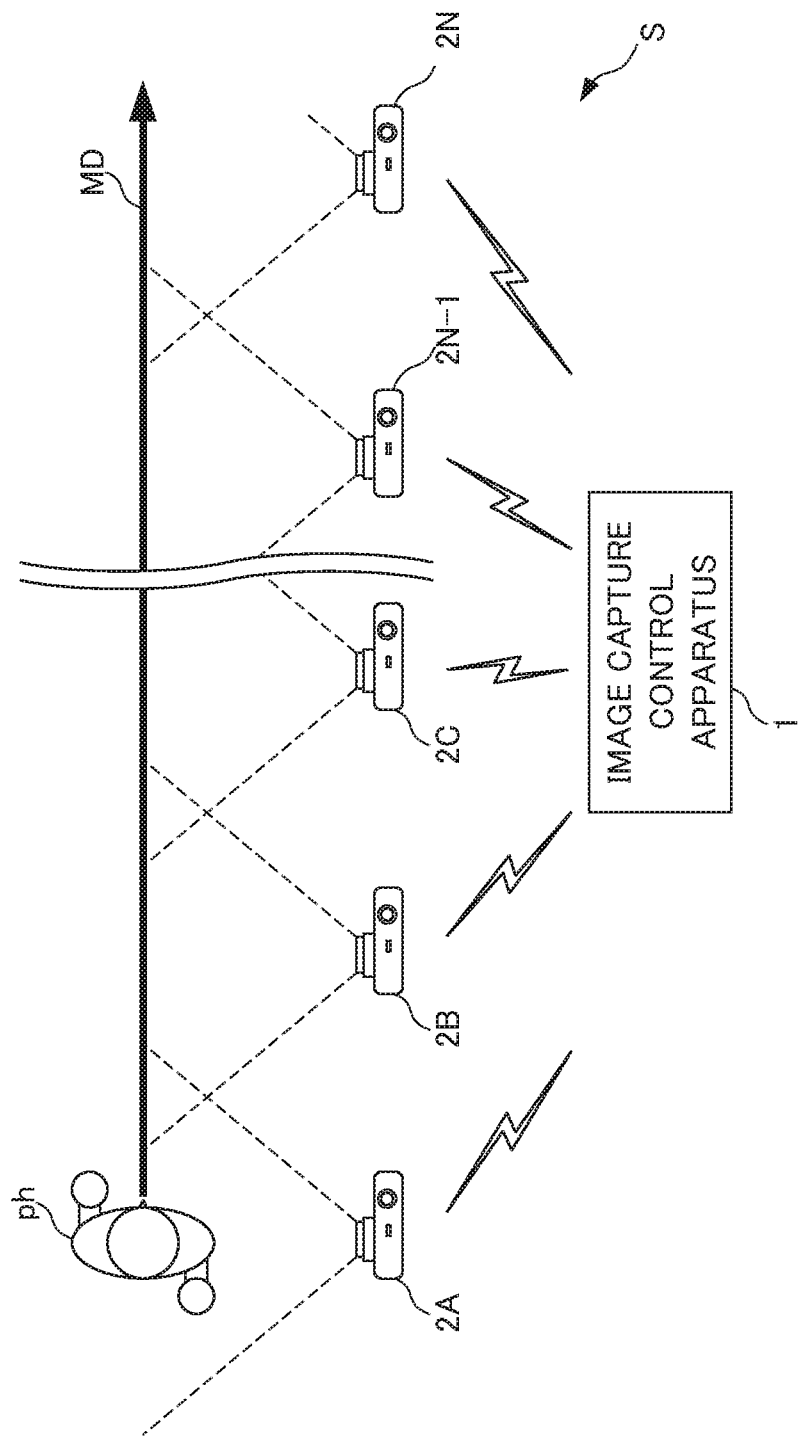
FIG. 1 is a system configuration diagram showing a system configuration of a subject tracking moving image generation system according to one embodiment of the present invention.

FIG. 1 is a system configuration diagram showing a system configuration of a subject tracking moving image generation system according to one embodiment of the present invention. It should be noted that an example is described in the present embodiment in which a moving image with a runner ph running a predetermined section as a photographed target (specific subject) is photographed so as to generate a moving image in which the runner ph is positioned at the center of the moving image and its background changes as the runner ph moves as if running along with the runner side by side.

As shown in FIG. 1, the subject tracking moving image generation system S includes an image capture control apparatus 1 and a plurality of image capture apparatuses 2A to 2N.

The image capture control apparatus 1 is configured to be able to communicate with each of the image capture apparatuses 2A to 2N.

The image capture control apparatus 1 generates data of subject tracking moving images using frame images constituting subject tracking moving images extracted from photographed moving images transmitted from each of the image capture apparatuses 2A to 2N (hereinafter, referred to as "constitutive frame image").

Furthermore, the image capture apparatuses 2A to 2N are provided parallel to a moving path MD of the runner ph so that each of the image capture apparatuses 2A to 2N has a different photographing area and portions of the angle of view overlaps with each other. More specifically, the image capture apparatus 2A is provided at a position where the runner ph is located at the center of the angle of view at a start position where the runner ph has not started to run, for example. The remaining image capture apparatuses 2B to 2N are provided at positions where the neighboring image capture apparatuses 2 can cover the angles of view of each other with the runner ph at the center position in a case in which the runner ph is displaced from the center position of the angle of view of each of the image capture apparatuses 2B to 2N on the moving path MD. In cases where the individual image capture apparatuses 2A to 2N are not explained specifically, they are referred to as the image capture apparatus 2.

In the image capture apparatuses 2A to 2N, photography starts with the runner ph moving or a user's operation for instructing to start photographing. Then, constitutive frame images are acquired from photographed images photographed by each of the image capture apparatuses 2A to 2N.

The subject tracking moving image generation system S is configured to couple the constitutive frame images in the order of photographed time in temporal sequence so as to generate data of the subject tracking moving images.

With such a configuration, the subject tracking moving image generation system S has a function that can acquire a subject tracking moving image in which a moving subject as a specific subject is positioned at the center constantly in the moving image at a predetermined size. With such a configuration, it is possible for a user to enjoy the moving image with a feeling of running along with the runner as a photographed target side by side.

Figure 2:
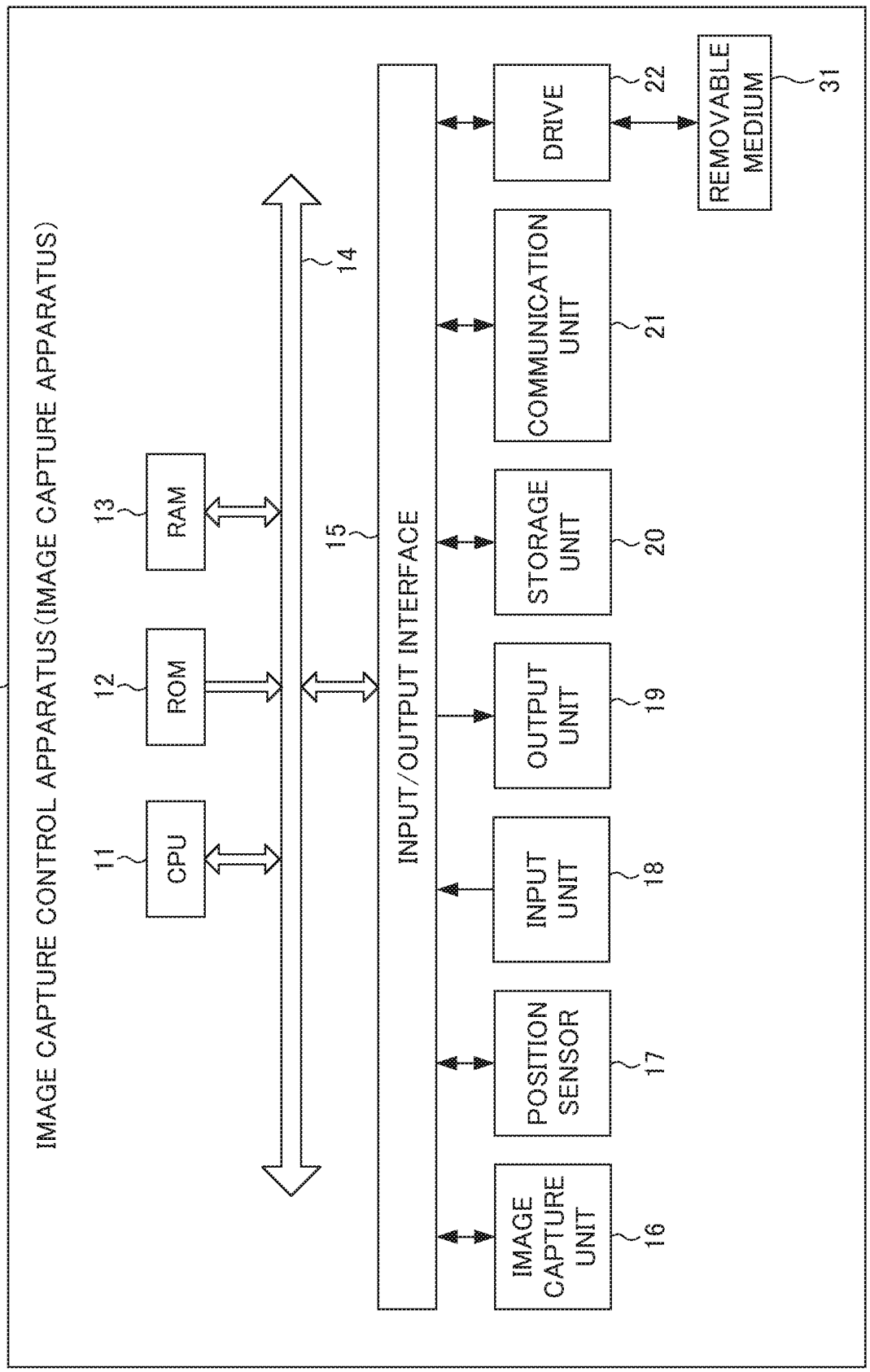
FIG. 2 is a block diagram showing a hardware configuration of an image capture control apparatus and an image capture apparatus constituting the subject tracking moving image generation system of FIG. 1.

FIG. 2 is a block diagram showing a hardware configuration of the image capture control apparatus 1 and the image capture apparatus 2 constituting such the subject tracking moving image generation system S.

The image capture control apparatus 1 and the image capture apparatus 2 are configured as, for example, a digital camera.

In the present embodiment, the image capture control apparatus 1 is established as a main machine of the image capture apparatus 2, and the image capture apparatus 2 is established as a sub machine of the image capture control apparatus 1. Furthermore, although the image capture control apparatus 1 is described so that it has an image capture function for the purpose of illustration, it may be configured not to include an image capture function, and it is sufficient so long as it has at least a function of communicating with the image capture apparatus 2 and a function of processing an image acquired from the image capture apparatus 2.

The image capture control apparatus 1 and the image capture apparatus 2 include a CPU (Central Processing Unit) 11, ROM (Read Only Memory) 12, RAM (Random Access Memory) 13, a bus 14, an input/output interface 15, an image capture unit 16, a position sensor 17, an input unit 18, an output unit 19, a storage unit 20, a communication unit 21, and a drive 22.

The CPU 11 executes various processing according to programs that are recorded in the ROM 12, or programs that are loaded from the storage unit 20 to the RAM 13.

The RAM 13 also stores data and the like necessary for the CPU 11 to execute the various processing, as appropriate.

The CPU 11, the ROM 12 and the RAM 13 are connected to one another via the bus 14. The input/output interface 15 is also connected to the bus 14. The image capture unit 16, the position sensor 17, the input unit 18, the output unit 19, the storage unit 20, the communication unit 21, and the drive 22 are connected to the input/output interface 15.

The image capture unit 16 includes an optical lens unit and an image sensor, which are not shown.

In order to photograph a subject, the optical lens unit is configured by a lens such as a focus lens and a zoom lens for condensing light.

The focus lens is a lens for forming an image of a subject on the light receiving surface of the image sensor. The zoom lens is a lens that causes the focal length to freely change in a certain range.

The optical lens unit also includes peripheral circuits to adjust setting parameters such as focus, exposure, white balance, and the like, as necessary.

The image sensor is configured by an optoelectronic conversion device, an AFE (Analog Front End), and the like.

The optoelectronic conversion device is configured by a CMOS (Complementary Metal Oxide Semiconductor) type of optoelectronic conversion device and the like, for example. Light incident through the optical lens unit forms an image of a subject in the optoelectronic conversion device. The optoelectronic conversion device optoelectronically converts (i.e. captures) the image of the subject, accumulates the resultant image signal for a predetermined time interval, and sequentially supplies the image signal as an analog signal to the AFE.

The AFE executes a variety of signal processing such as A/D (Analog/Digital) conversion processing of the analog signal. The variety of signal processing generates a digital signal that is output as an output signal from the image capture unit 16.

Such an output signal of the image capture unit 16 is hereinafter referred to as "data of a captured image". Data of a captured image is supplied to the CPU 11, an image processing unit (not illustrated), and the like as appropriate.

Furthermore, the image capture apparatus 16 outputs captured images as frame images constituting a moving image. As a result, the image capture control apparatus 1 and the image capture apparatus 2 couple the frame images in the order of photographing time in temporal sequence so as to acquire a moving image.

The position sensor 17 uses GPS (Global Positioning System) to detect the position of an apparatus that can acquire information of photographing area such as a photographing position, direction, and angle of view. The apparatus that acquired information of a position from the position sensor 17 specifies an area of the angle of view from the data relating to the apparatus.

The input unit 18 is configured by various buttons, and the like, and inputs a variety of information in accordance with instruction operations by the user.

The output unit 19 is configured by the display unit, a speaker, and the like, and outputs images and sound.

The storage unit 20 is configured by DRAM (Dynamic Random Access Memory) or the like, and stores data of various images.

The communication unit 21 controls communication with other devices (not shown) via networks including the Internet.

A removable medium 31 composed of a magnetic disk, an optical disk, a magneto-optical disk, semiconductor memory or the like is installed in the drive 22, as appropriate. Programs that are read via the drive 22 from the removable medium 31 are installed in the storage unit 20, as necessary. Similarly to the storage unit 20, the removable medium 31 can also store a variety of data such as the image data stored in the storage unit 20.

Next, a functional configuration for executing subject tracking moving image generation processing among the functional configurations of such an image capture control apparatus 1 is described.

"Subject tracking moving image generation processing" refers to processing, in the plurality of image capture apparatuses 2, of photographing a photographed moving image including a specific subject as a moving photographed target, acquiring constitutive frame images based on frame images constituting photographed moving images, and coupling the constitutive frame images thus acquired in the order of photographing time in temporal sequence, thereby generating a subject tracking moving image.

In the present example, in a case of photographing a state in which a specific subject as a photographed target is positioned at the center of an angle of view, the image capture apparatus 2 is configured so that a pertinent frame image is transmitted from one of the image capture apparatuses 2 performing photographing of the specific subject. Furthermore, in a case of photographing a state in which a specific subject as a photographed target is not positioned at the center of an angle of view (a state of a specific subject going toward the center or going away from the center), it is configured so that frame images are transmitted from the neighboring two image capture apparatuses 2 performing photographing of the specific subject. In other words, in a case in which a specific subject is positioned at the center of an angle of view in any image capture apparatus 2, the image capture apparatuses 2 are provided so that the specific subject is photographed by only a single image capture apparatus 2. Furthermore, in a case in which a specific subject is positioned at a position away from the center of an angle of view of any image capture apparatus 2, the image capture apparatuses 2 are provided so that the specific subject is photographed by two image capture apparatuses 2, one of which captures the specific subject around the center and the other of which is positioned away.

Figure 3:
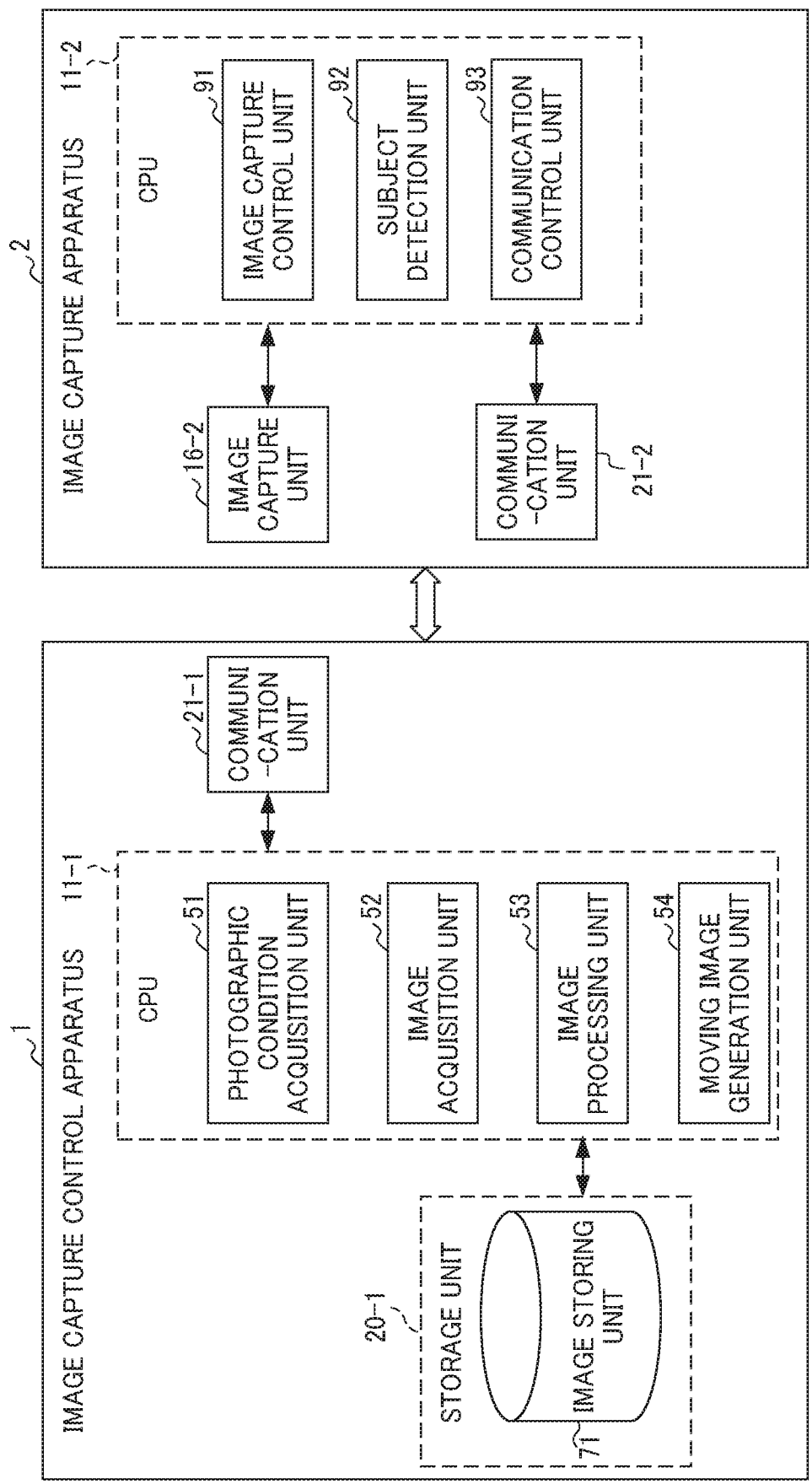
FIG. 3 is a functional block diagram showing a functional configuration for executing subject tracking moving image generation processing among the functional configurations of the image capture control apparatus and the image capture apparatus of FIG. 2.

FIG. 3 is a functional block diagram showing a functional configuration for executing subject tracking moving image generation processing, among the functional configurations of such an image capture control apparatus 1 and image capture apparatus 2. It should be noted that, in a case of distinguishing between the image capture control apparatus 1 and the image capture apparatus 2 as hardware, a reference numeral "-1" is attached for items indicating hardware of the image capture control apparatus 1 and a reference numeral "-2" is attached for items indicating hardware of the image capture apparatus 2.

In a case of executing the subject tracking moving image generation processing, a photographic condition acquisition unit 51, an image acquisition unit 52, an image processing unit 53, and a moving image generation unit 54 function in a CPU 11-1 of the image capture control apparatus 1.

Furthermore, an image storing unit 71 is provided at an area of a storage unit 20-1 of the image capture control apparatus 1.

In the image storing unit 71, various image data such as captured images and various moving image data such as photographed moving images and subject tracking moving images are stored.

The photographic condition acquisition unit 51 acquires a current photographic condition of a specific subject via a communication unit 21-1 from each of the image capture apparatuses 2. In other words, the photographic condition acquisition unit 51 acquires a notification that a specific subject exists as information relating to a photographic condition as to whether the specific subject as a photographed target exists within a current angle of view of each of the image capture apparatus 2.

Furthermore, the photographic condition acquisition unit 51 counts the number of image capture apparatuses 2 that are currently photographing the specific subject from the notification that the specific subject acquired exists.

The image acquisition unit 52 acquires pertinent frame images of a photographed moving image photographed at each of the image capture apparatuses 2 as photographed images via the communication unit 21-1. The image acquisition unit 52 causes the photographed images acquired to be stored in the image storing unit 71.

The image processing unit 53 performs processing of clipping a subject-including area that is a partial image area of a predetermined size (hereinafter, simply referred to as "image area") so that the specific subject is positioned at the center in the photographed images acquired by the image acquisition unit 52. As a result of this, the image processing unit 53 generates constitutive frame images that constitute a subject tracking moving image.

Here, the details of generation of the constitutive frame images by clipping processing at the image processing unit 53 are described.

In a case in which a specific subject is positioned at the center of the frame images at a predetermined size, the constitutive frame images are generated by way of processing of clipping an image area with the predetermined size as-is.

On the other hand, in a case in which the specific subject is not positioned at the center of the frame images or in a case in which an image in which the specific subject is positioned at the center with a predetermined size cannot be acquired, a corresponding image area is clipped from each frame image so as to supplement a deficient part from a plurality of frame images photographed by another image capture apparatus 2, and then the clipped images (hereinafter, referred to as "clipped image") are put together, thereby generating a single constitutive frame image. Alternatively, a pertinent image area is clipped from an image in which frame images are composited to supplement a deficient part from a plurality of frame images photographed by another image capture apparatus 2 and which is composited so that a specific subject is positioned at the center at a predetermined size (hereinafter, referred to as "composite image"), thereby generating a single constitutive frame image.

In other words, the constitutive frame image is generated by clipping a predetermined image area from an image and compositing each image, or by compositing each image and performing processing of clipping a pertinent image area.

FIG. 4 is a schematic diagram showing an example of generating a constitutive frame image by clipping processing.

More specifically, in the example of FIG. 4, a case is illustrated in which it is not possible to generate a constitutive frame image by clipping with a predetermined size as-is in a first frame image.

Figure 4A:
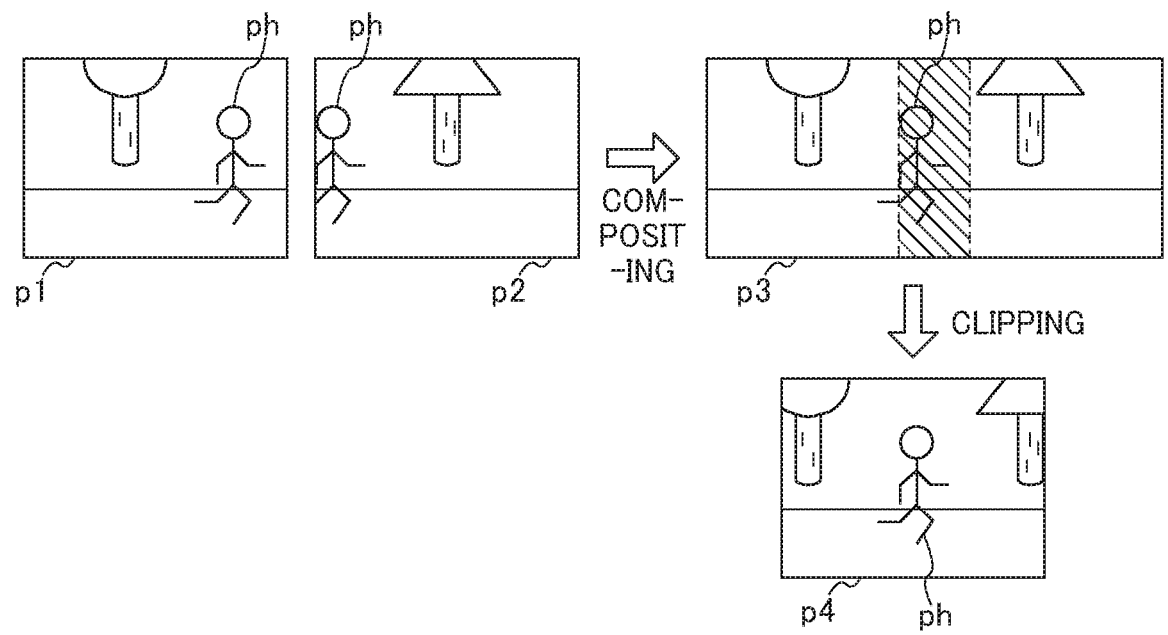
FIGS. 4A and 4B are schematic diagrams showing specific examples of clipping processing.

As shown in the first example of FIG. 4A, in a first frame image p1, a runner ph as a specific subject is positioned at the right edge, and thus it is not possible to clip an image area with a predetermined size in which the runner ph as the specific subject is positioned at the center. For this reason, a second frame image p2 acquired by the image capture apparatus 2 located at a side away from the center is used. In the second frame image p2, the runner ph as the specific subject is positioned at the left edge in the image, and thus an area proximal to the runner ph as the specific subject overlaps the first frame image p1.

In the first example, an image p3 is generated by superimposing and compositing an area of the first frame image p1 with an area of the second frame image p2 (hatched area in FIG. 4A). Thereafter, in the first example, a constitutive frame image p4 is generated by clipping an image area in which the runner ph as the specific subject is positioned at the center of the image at a predetermined size.

Figure 4B:
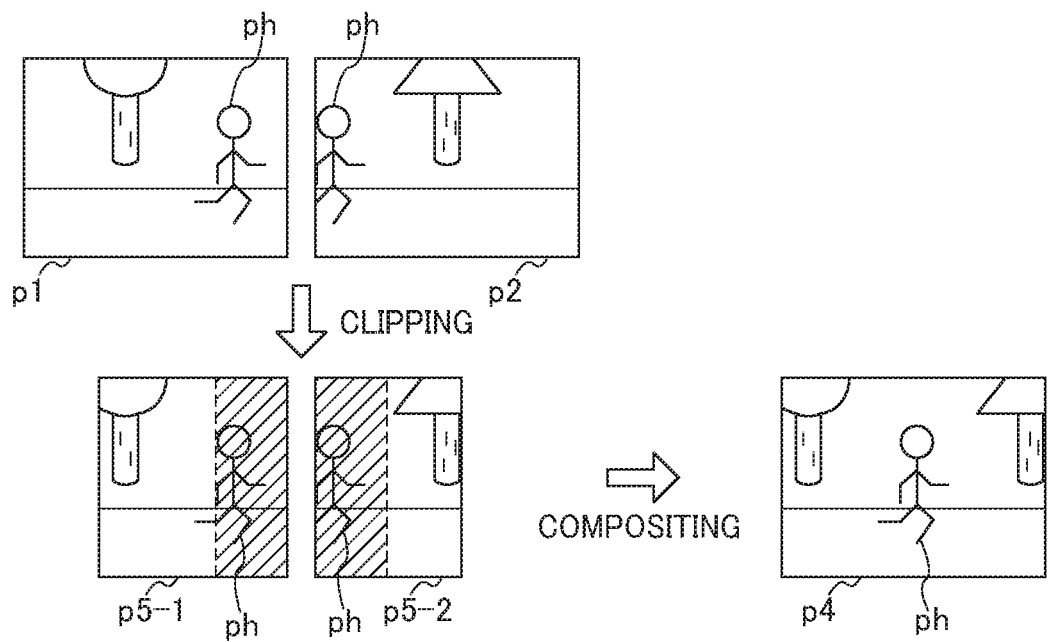

On the other hand, the second example of FIG. 4B is different from the first example. First, a first clipped image p5-1 is generated by clipping an image area which includes the runner ph as the specific subject and is made half the width of a predetermined size around the runner ph as the specific subject as well as an image area which includes an area that overlaps the second frame image p2 (hatched area in FIG. 4B) from the first frame image p1. Similarly to the first frame image p1, in the second frame image p2 as well, a second clipped image p5-2 is generated by clipping an image area which includes the runner ph as the specific subject and is made half the width of a predetermined size around the runner ph as the specific subject as well as an image area which includes an area that overlaps the first frame image p1 (hatched area in FIG. 4B). Then, a constitutive frame image p4 is generated by compositing the first clipped image p5-1 with the second clipped image p5-2 at the overlapped area.

It should be noted that the constitutive frame image p4 is generated by the method of the first example in the present embodiment.

With reference to FIG. 3 again, the moving image generation unit 54 generates a subject tracking moving image by coupling the constitutive frame images generated by the image processing unit 53. In other words, the moving image generation unit 54 generates the subject tracking moving image by coupling in temporal sequence the constitutive frame images generated by sequentially acquiring and performing clipping processing. The moving image generation unit 54 causes the subject tracking moving image thus generated to be stored in the image storing unit 71.

Furthermore, in a case of performing the subject tracking moving image generation processing, an image capture control unit 91, a subject detection unit 92, and a communication control unit 93 function in a CPU 11-2 of the image capture apparatus 2.

The image capture control unit 91 controls an image capture unit 16-2 so as to perform photographing of a photographed moving image.

The subject detection unit 92 detects a subject from the photographed moving image photographed by the image capture unit 16-2 and judges whether there is a specific subject as a photographed target (as well as its position and its size). The subject detection unit 92 outputs a detection result to the communication control unit 93. For the subject detection at the subject detection unit 92, an existing subject detection technique using image recognition is used. Furthermore, for the specific subject, whether there is a specific subject (as well as its position and its size) is judged based on image matching and the like (similarity judgment of image) between an image of a specific subject arbitrarily designated by a user (characteristic information) and an image portion of a subject detected (characteristic information).

In a case in which the specific subject exists in an angle of view based on a detection result outputted from the subject detection unit 92, the communication control unit 93 transmits a notification that the specific subject exists to the image capture control apparatus 1 via the communication unit 21-2.

Furthermore, the communication control unit 93 transmits frame images of a photographed moving image at the time when the specific subject exists within the angle of view as photographed images to the image capture control apparatus 1 via the communication unit 21-2.

Figure 5:
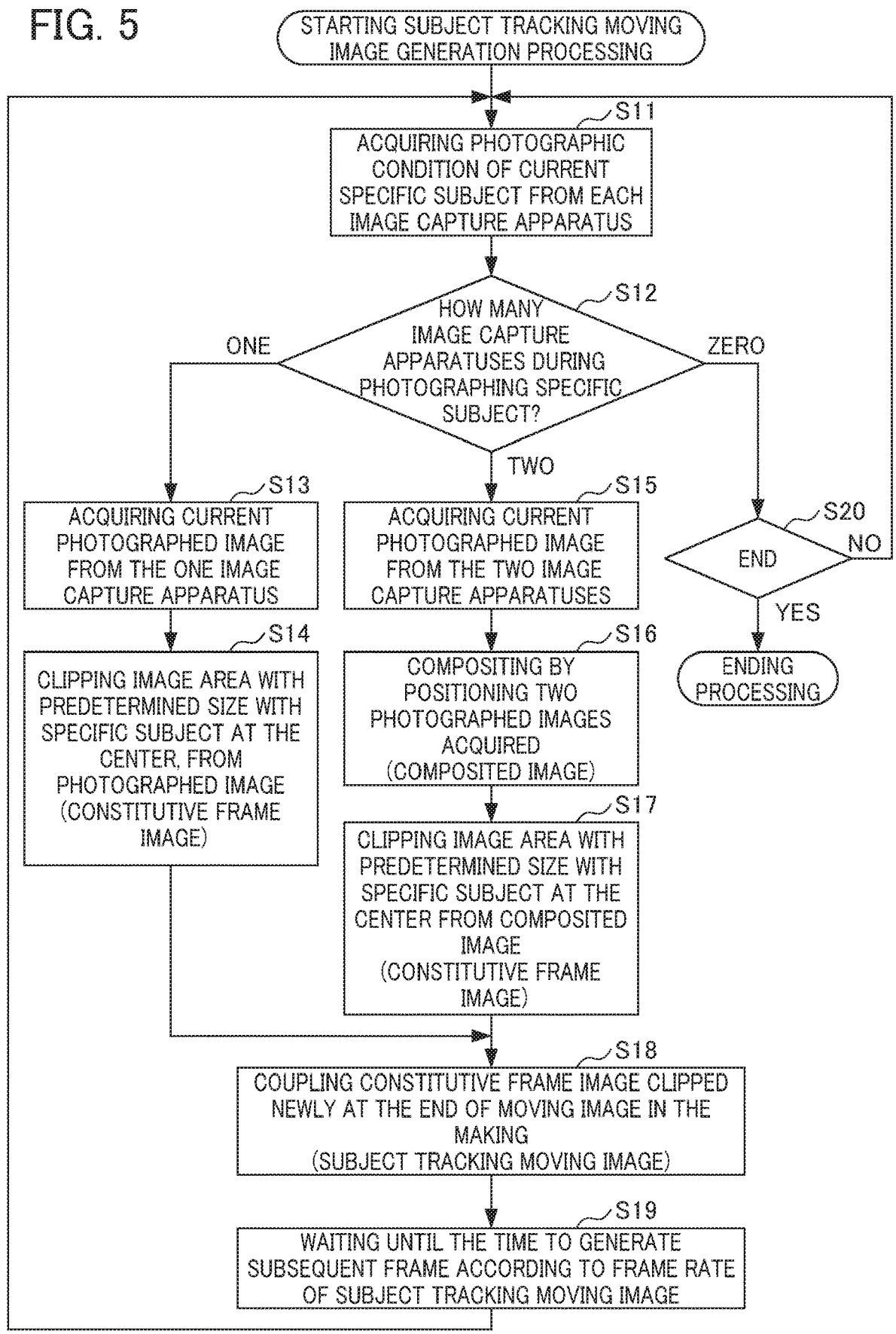
FIG. 5 is a flowchart illustrating a flow of subject tracking moving image generation processing executed by the image capture control apparatus of FIG. 2 having the functional configuration of FIG. 3.

FIG. 5 is a flowchart illustrating a flow of the subject tracking moving image generation processing executed by the image capture control apparatus 1 of FIG. 2 having the functional configuration of FIG. 3.

The subject tracking moving image generation processing starts by an operation by a user to start the subject tracking moving image generation processing on an input unit 18-1.

In Step S11, the photographic condition acquisition unit 51 acquires a photographic condition of a current specific subject from each of the image capture apparatuses 2. In other words, the photographic condition acquisition unit 51 acquires a notification that the specific subject exists in a photographing frame from each of the image capture apparatus 2.

In Step S12, the photographic condition acquisition unit 51 counts the number of the image capture apparatuses 2 that are currently photographing the specific subject (the specific subject exists within the photographing frame).

In a case in which the number of the image capture apparatuses 2 that are currently photographing the specific subject is one, it is judged as "one" in Step S12, and the processing advances to Step S13.

In a case in which the number of the image capture apparatuses 2 that are currently photographing the specific subject is two, it is judged as "two" in Step S12, and the processing advances to Step S15. The processing of Step S15 and higher is described later.

In a case in which the number of the image capture apparatuses 2 that are currently photographing the specific subject is zero, it is judged as "zero" in Step S12, and the processing advances to Step S20.

In Step S13, the image acquisition unit 52 acquires current photographed images from the one image capture apparatus 2 that is photographing the specific subject.

In Step S14, the image processing unit 53 generates a constitutive frame image by clipping, from the photographed image thus acquired, an image area with a predetermined size with the specific subject at the center. Then, the processing advances to Step S18. The processing of Step S18 and higher is described later.

In Step S15, the image acquisition unit 52 acquires the current photographed images from the two image capture apparatuses 2 that are photographing the specific subject.

In Step S16, the image processing unit 53 generates a composite image by compositing to match the positions of two photographed images.

In Step S17, the image processing unit 53 generates a constitutive frame image by clipping, from the composite image thus generated, an image area with a predetermined size with the specific subject at the center.

In Step S18, the moving image generation unit 54 generates a subject tracking moving image by coupling the constitutive frame images that are clipped newly at the end of a moving image in the making. In other words, the moving image generation unit 54 generates the subject tracking moving image by sequentially coupling the constitutive frames. In a case in which there is a constitutive frame image that is newly clipped, the subject tracking moving image is generated by coupling at the end of a moving image. Data of the subject tracking moving image thus generated is stored in the image storing unit 71.

In Step S19, the moving image generation unit 54 waits until the time to generate a subsequent frame according to a frame rate of the data of the subject tracking moving image. Thereafter, the processing returns to Step S11.

In Step S20, the CPU 11-1 judges whether to end or not.

In a case of not ending, it is judged as NO in Step S20 and the processing returns to Step S11.

In a case of ending, it is judged as YES in Step S20, and the subject tracking moving image generation processing in the image capture control apparatus 1 ends.

Figure 6:
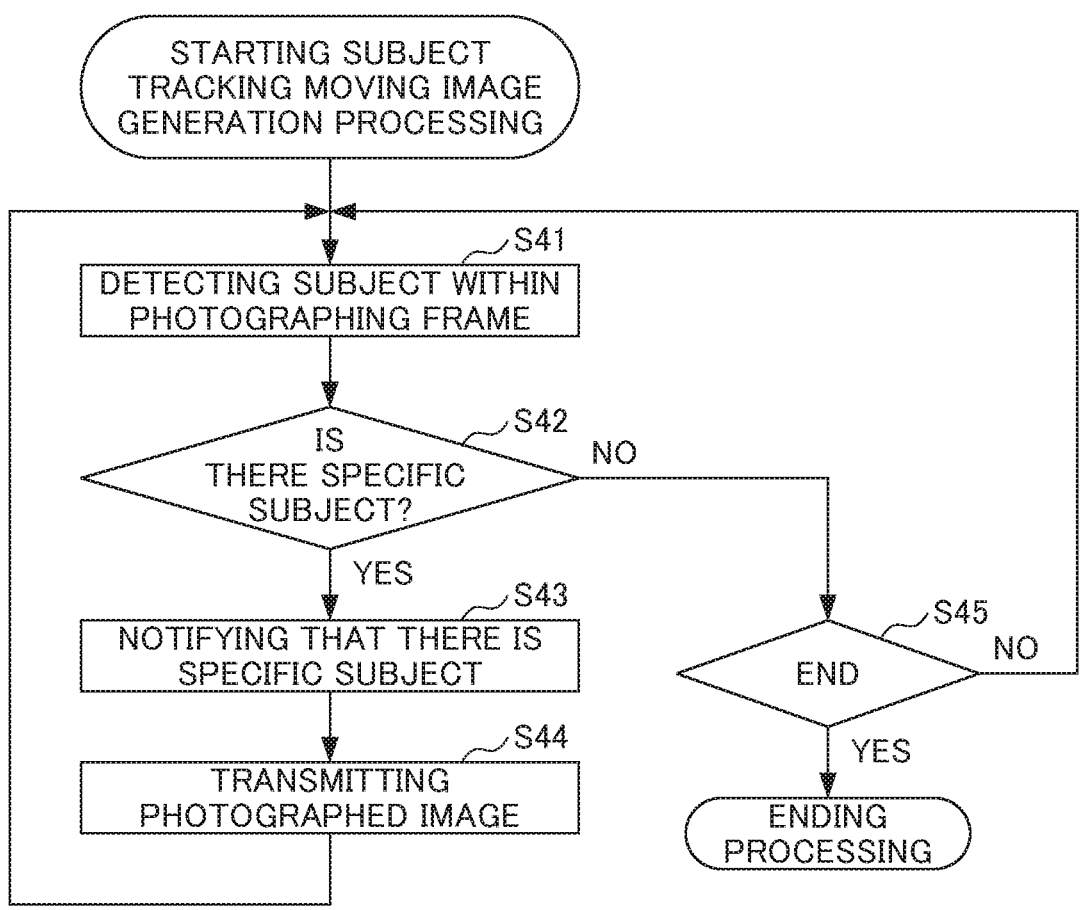
FIG. 6 is a flowchart illustrating a flow of the subject tracking moving image generation processing executed by the image capture apparatus of FIG. 2 having the functional configuration of FIG. 3.

FIG. 6 is a flowchart illustrating a flow of subject tracking moving image generation processing executed by the image capture apparatus 2 of FIG. 2 having the functional configuration of FIG. 3.

The subject tracking moving image generation processing starts by an operation by a user to start the subject tracking moving image generation processing on the input unit 18-2.

When the subject tracking moving image generation processing starts, the image capture control unit 91 controls the image capture unit 16-2 to start photographing.

In Step S41, the subject detection unit 92 detects a subject within a photographing frame.

In Step S42, the subject detection unit 92 judges whether a specific subject as a photographed target exists. In a case in which there is no a specific subject, it is judged as NO in Step S42 and the processing advances to Step S45. The processing of Step S45 is described later.

In a case in which there is a specific subject, it is judged as YES in Step S42, and the processing advances to Step S43.

In Step S43, the communication control unit 93 notifies that the specific subject as a photographed target exists to the image capture control apparatus 1 via the communication unit 21-2.

In Step S44, the communication control unit 93 transmits frame images of a photographed moving image corresponding to the time when it is judged that the specific subject as a photographed target exists, as photographed images to the image capture control apparatus 1 via the communication unit 21-2.

In Step S45, the CPU 11-2 judges whether to end or not.

In a case of not ending, it is judged as NO in Step S45, and the processing returns to Step S41.

In a case of ending, it is judged as YES in Step S45, and the subject tracking moving image generation processing at the image capture apparatus 2 ends.

Second Embodiment

In the first embodiment, it is configured so that the image capture apparatuses 2A to 2N constantly perform photographing and a dedicated image capture control apparatus 1 sequentially switches and acquires the captured images transmitted from the image capture apparatuses 2A to 2N and performs clipping and coupling of the photographed images thus acquired, thereby generating a subject tracking moving image.

On the other hand, in the present embodiment, it is configured so that the image capture apparatuses 2A to 2N perform photographing at only a required timing (designated) and a dedicated image capture control apparatus 1 sequentially switches and instructs to photograph from the image capture apparatuses 2A to 2N and acquires and couples the clipped images generated in the image capture apparatuses 2, thereby generating a subject tracking moving image. Furthermore, in the present embodiment, upon photographing with the image capture apparatuses 2, it is configured so that the image capture control apparatus 1 evaluates a period unnecessary for photographing so as to photograph by sequentially switching only the image capture apparatuses 2 that contribute to the generation of the subject tracking moving image.

In the explanation of the second embodiment, since a system configuration of a subject tracking moving image generation system S, as well as hardware configurations of an image capture control apparatus 1 and an image capture apparatus 2 are similar to those of the first embodiment, explanations thereof are omitted. Furthermore, explanations for the other configurations similar to those of the first embodiment are also omitted.

Figure 7:
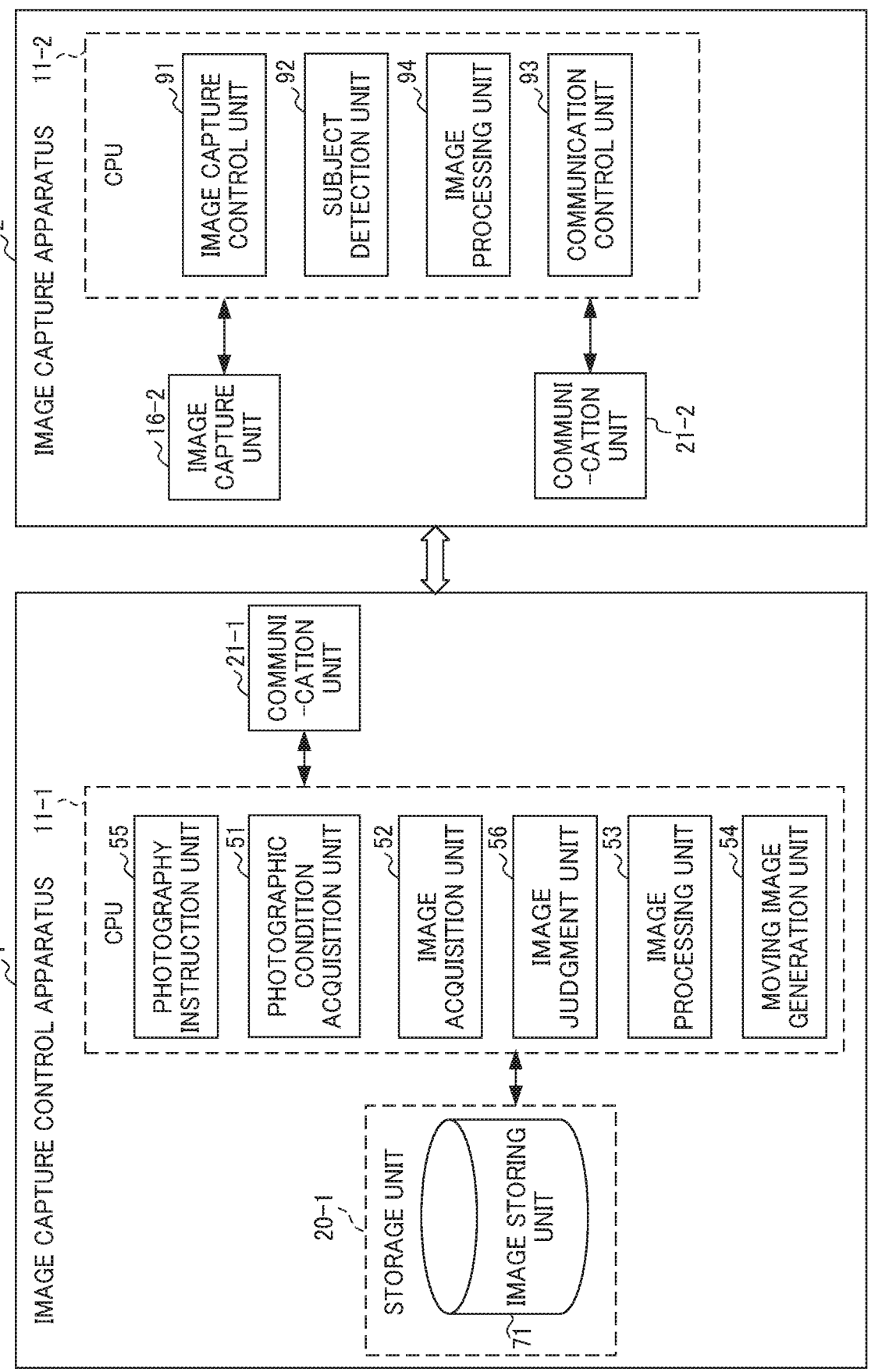
FIG. 7 is a functional block diagram showing a functional configuration for executing subject tracking moving image generation processing of a second embodiment, among the functional configurations of the image capture control apparatus and the image capture apparatus of FIG. 2.

FIG. 7 is a functional block diagram showing a functional configuration for executing subject tracking moving image generation processing in a second embodiment, among the functional configurations of the image capture control apparatus 1 and the image capture apparatus 2 of FIG. 2.

In a case of executing the subject tracking moving image generation processing in the second embodiment, a photography instruction unit 55, a photographic condition acquisition unit 51, an image acquisition unit 52, an image judgment unit 56, an image processing unit 53, and a moving image generation unit 54 function in a CPU 11-1 of the image capture control apparatus 1.

Furthermore, an image storing unit 71 is provided at an area of a storage unit 20-1.

The photography instruction unit 55 performs an instruction to start and end photographing to each of the image capture apparatuses 2 via the communication unit 21-1. The photography instruction unit 55 includes photographic conditions upon instructing to start and end photographing.

The image judgment unit 56 judges whether to include all of an area with a predetermined size with a specific subject at the center in a clipped image acquired by the image acquisition unit 52.

The image processing unit 53 generates a constitutive frame image by compositing by positioning clipped images acquired from each of the image capture apparatuses 2. In the present example, since clipping images is conducted in each of the image capture apparatuses 2, the image processing unit 53 only performs compositing, i.e. only performs generating a composite image. It should be noted that the image processing unit 53 treats clipped images that include all of an image area with a predetermined size with a specific subject at the center, and thus is unnecessary to composite as a constitutive frame image as-is.

Furthermore, in a case of executing the subject tracking moving image generation processing of the second embodiment, an image capture control unit 91, a subject detection unit 92, an image processing unit 94, and a communication control unit 93 function in a CPU 11-2 of the image capture apparatus 2.

The image capture control unit 91 controls the image capture unit 16-2 to start and end photographing based on an instruction of starting and ending photographing from the image capture control apparatus 1.

The image processing unit 94 acquires frame images constituting a photographed moving image photographed by the image capture unit 16-2 as photographed images so as to generate clipped images by clipping image, from the photographed images, areas with a predetermined size with a specific subject as a photographed target at the center.

The communication control unit 93 acquires an instruction to start and end photographing from the image capture control apparatus 1 via the communication unit 21-2 and outputs to the image capture control unit 91.

Furthermore, the communication control unit 93 transmits the clipped images generated by the image processing unit 94 to the image capture control apparatus 1 via the communication unit 21-2.

Figure 8:
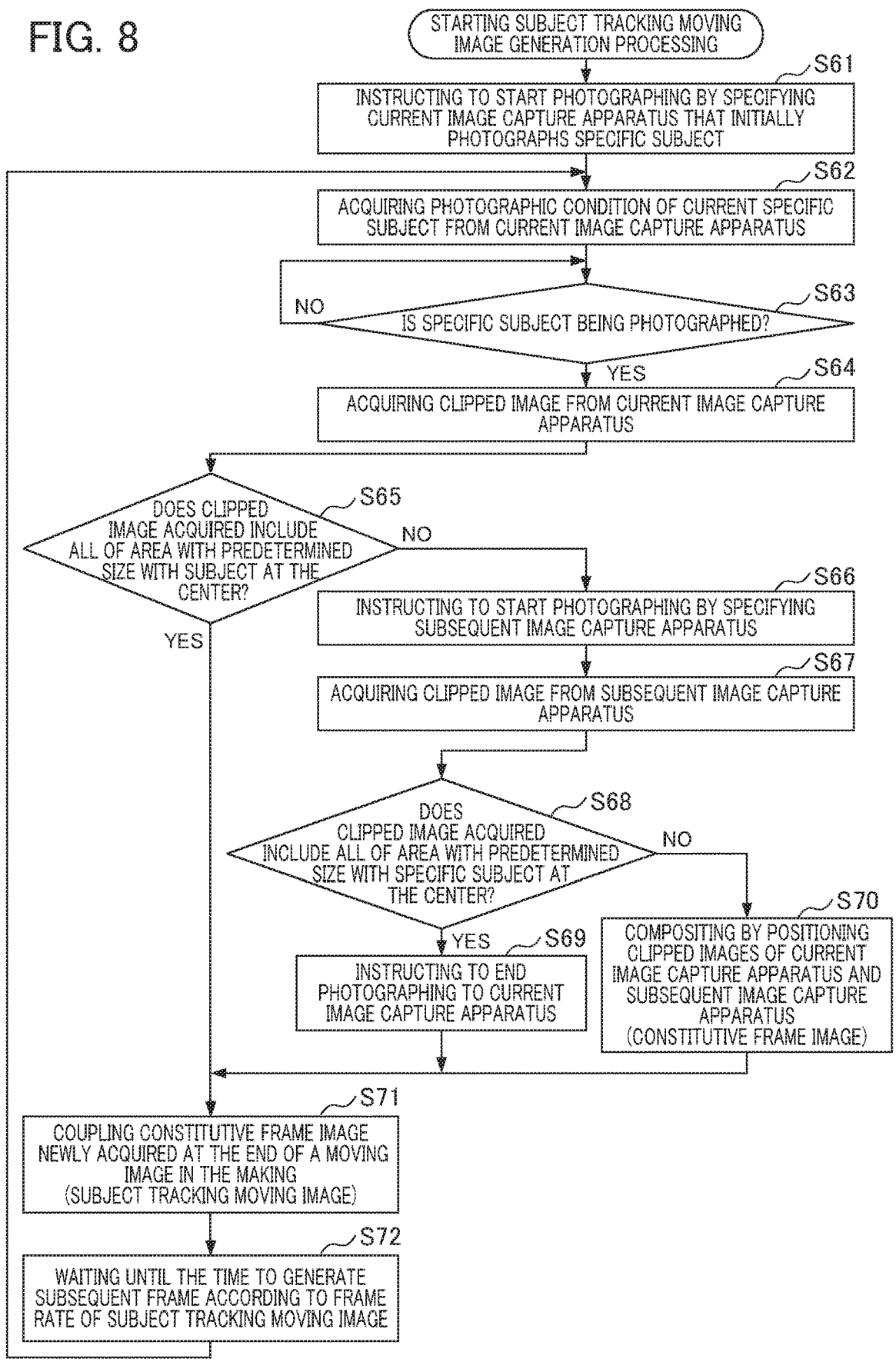
FIG. 8 is a flowchart illustrating the flow of subject tracking moving image generation processing of a second embodiment executed by the image capture control apparatus of FIG. 2 having the functional configuration of FIG. 7.

FIG. 8 is a flowchart showing a flow of the subject tracking moving image generation processing of the second embodiment executed by the image capture control apparatus 1 of FIG. 2 having the functional configuration of FIG. 7.

The subject tracking moving image generation processing starts with an operation by a user to start the subject tracking moving image generation processing on an input unit 18-1.

In Step S61, the photography instruction unit 55 instructs to start photographing by specifying a current image capture apparatus 2 that initially photographs a specific subject.

In Step S62, the photographic condition acquisition unit 51 acquires a photographic condition of the current specific subject from the current image capture apparatus 2.

In Step S63, the photographic condition acquisition unit 51 judges whether during photographing of the specific subject.

In a case of not being during photographing of the specific subject, it is judged as NO in Step S63 and it enters a standby state.

In a case of being during photographing of the specific subject, it is judged as YES in Step S63, and the processing advances to Step S64.

In Step S64, the image acquisition unit 52 acquires the clipped images from the current image capture apparatus 2.

In Step S65, the image judgment unit 56 judges whether the clipped images acquired include all of an area with a predetermined size with the specific subject at the center.

In a case in which the clipped images acquired include all of the area with a predetermined size with the specific subject at the center, it is judged as YES in Step S65, and the processing advances to Step S71. The processing of Step S71 and higher is described later.

In a case in which the clipped images acquired do not include all of the area with a predetermined size with the specific subject at the center, it is judged as NO in Step S65, and the processing advances to Step S66.

In Step S66, the photography instruction unit 55 specifies a neighboring image capture apparatus 2 (hereinafter, referred to as "subsequent image capture apparatus 2" to the current image capture apparatus 2 and instructs to start photographing. The photography instruction unit 55 includes photographic conditions of the current image capture apparatus 2 on this occasion.

In Step S67, the image acquisition unit 52 acquires clipped images from the subsequent image capture apparatus 2.

In Step S68, the image judgment unit 56 judges whether the clipped images acquired include all of an image area with a predetermined size with a specific subject at the center.

In a case in which the clipped images acquired include all of an image area with a predetermined size with a specific subject at the center, it is judged as YES in Step S68, and the processing advances to Step S69.

In Step S69, the photography instruction unit 55 instructs to end photographing to the current image capture apparatus 2. Then, the processing advances to Step S71.

On the other hand, in a case in which the clipped images acquired do not include all of an image area with a predetermined size with a specific subject at the center, it is judged as NO in Step S68, and the processing advances to Step S70.

In Step S70, the image processing unit 53 generates a constitutive frame image by compositing to position the clipped images of the current image capture apparatus 2 and the subsequent image capture apparatus 2. Then, the processing advances to Step S71.

In Step S71, the moving image generation unit 54 generates a subject tracking moving image by coupling the clipped images that are newly acquired at the end of a moving image during generation. The subject tracking moving image thus generated is stored in the image storing unit 71.

In Step S72, the moving image generation unit 54 waits until the time to generate a subsequent frame according to a frame rate of data of the subject tracking moving image.

Figure 9:
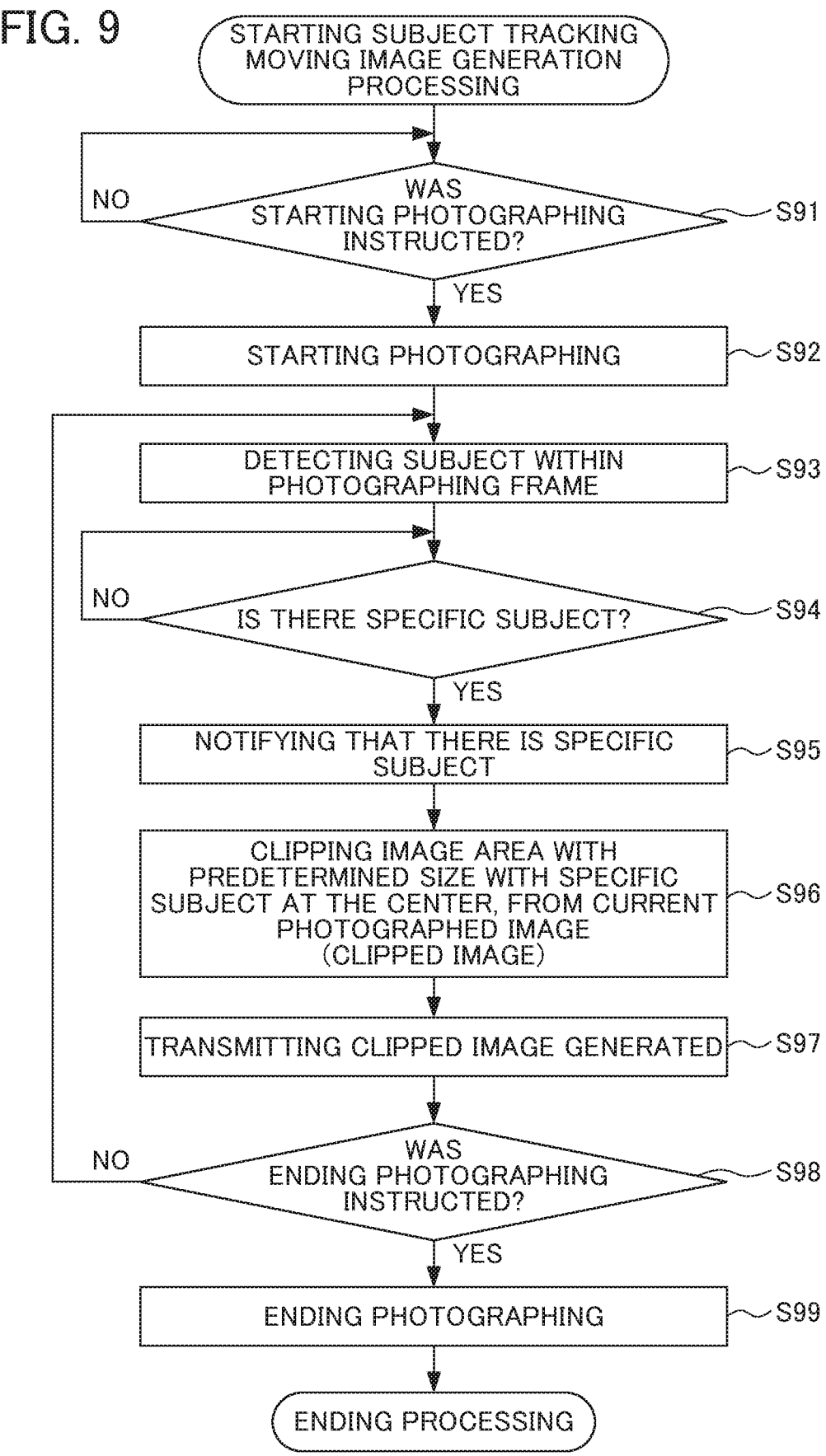
FIG. 9 is a flowchart illustrating the flow of subject tracking moving image generation processing in a second embodiment executed by the image capture apparatus of FIG. 2 having the functional configuration of FIG. 7.

FIG. 9 is a flowchart illustrating a flow of the subject tracking moving image generation processing of the second embodiment executed by the image capture apparatus 2 of FIG. 2 having the functional configuration of FIG. 7.

In Step S91, the communication control unit 93 judges whether starting photographing was instructed.

In a case in which starting photographing was not instructed, it is judged as NO in Step S91 and it enters a standby state.

In a case in which starting photographing was instructed, it is judged as YES in Step S91, and the processing advances to Step S92.

In Step S92, the image capture unit 91 controls the image capture unit 16 to start photographing.

In Step S93, the subject detection unit 92 detects a subject within a photographing frame.

In Step S94, the subject detection unit 92 judges whether a specific subject exists.

In a case in which the specific subject does not exist, it is judged as NO in Step S94 and it enters a standby state.

In a case in which the specific subject exists, it is judged as YES in Step S94, and the processing advances to Step S95.

In Step S95, the communication control unit 93 notifies that the specific subject exists.

In Step S96, the image processing unit 94 generates clipped images by clipping, from current photographed images, an image area with a predetermined size with the specific subject at the center.

In Step S97, the communication control unit 93 transmits the clipped images thus generated.

In Step S98, the communication control unit 93 judges whether ending photographing was instructed.

In a case in which ending photographing was not instructed, it is determined as NO in Step S98 and the processing returns to Step S93.

In a case in which ending photographing was instructed, it is determined as YES in Step S98, and the processing advances to Step S99.

In Step S99, the image capture control unit 91 controls the image capture unit 16 to end photographing. Then, the subject tracking moving image generation processing in the image capture apparatus 2 ends.

The subject tracking moving image generation system S configured as above includes the image capture unit 16, the image processing unit 53, and the moving image generation unit 54.

The image acquisition unit 52 acquires a plurality of moving images acquired by performing continuous photography by a plurality of image capture units 16 that is disposed so as to differentiate their photographing areas.

The subject detection unit 92 detects, by way of image recognition, from within each moving image acquired by the image acquisition unit 52, a subject arbitrarily designated.

The clipping control unit (the photographic condition acquisition unit 51 and the image processing unit 53), according to each timing in the continuous photography, selects a moving image including a subject-included area that is a partial image area in which the subject detected by the subject detection unit 92 is included at a predetermined position or in a predetermined size, among the plurality of moving images acquired by the image acquisition unit 52, and controls to execute selective clipping processing that clips an image within the subject-included area from the moving images thus selected.

The moving image generation unit 54 couples the plurality of images that is selectively clipped in the order of photographing time according to each timing in the continuous photography according to the control of the clipping control unit so as to generate a single moving image.

With such a configuration, the subject tracking moving image generation system S uses the images in the subject-included from the images captured by the plurality of image capture unit 16 to generate a moving image with the frame images constituting the moving image.

Therefore, with the subject tracking moving image generation system S, the distance to the specific subject becomes constant at the predetermined position or the specific subject becomes the predetermined size, and thus it is possible to generate a subject tracking moving image in which it seems that another subject is moving while the specific subject is being tracked without actually tracking the specific subject for photography. Therefore, it is possible for the subject tracking moving image generation system S to generate viewer-friendly moving image data in which the state of the moving subject is adjusted (for example, a position and a size in a moving image).

Furthermore, since the subject detection unit 92 judges whether there is the specific subject arbitrarily designated by the user (and a position and a size) by way of image recognition within the moving image which actually becomes a clipping target in the subject-included area, it is possible to generate a moving image by photographing a moving subject continuously in response to various kinds of subjects and various movements (for example, vertical movements) flexibly even in a case in which the kind, the size, the moving path and the like of a moving specific subject are not determined beforehand.

The image processing unit 53 selects, from the moving image thus selected, the moving image that includes the subject-included area in which the subject is included at a predetermined position and with a predetermined size, and controls execution of clipping processing that selectively clips an image in this subject-included area from the moving image thus selected.

With such a configuration, it is possible for the subject tracking moving image generation system S to generate a subject tracking moving image included at a predetermined position and with a predetermined size.

Furthermore, the image processing unit 53 controls execution of clipping processing that selectively clips an image within the subject-included area from the moving image thus selected so that a subject is positioned at the center at a predetermined size.

With such a configuration, it is possible for the subject tracking moving image generation system S to generate a subject tracking moving image in which the subject is constantly positioned at the center.

Furthermore, in the subject tracking moving image generation system S, a plurality of image capture units 16 is provided such that at least portions thereof in a photographing area on the moving path of the specific subject overlaps with each other.

In a case in which a subject-included area is included in a single moving image, the image processing unit 53 clips the subject-included area from this single moving image, and in a case in which the subject-included area is included by extending across a plurality of moving images, the image processing unit 53 controls so as to composite by clipping a portion of the subject-included area from each of the plurality of moving images.

With such a configuration, it is possible for the subject tracking moving image generation system S to generate a constitutive frame image by compositing a plurality of photographed moving images photographed by other image capture units 16, even in a case in which it is not possible to generate a constitutive frame image with a photographed moving image photographed by a single image capture unit 16.

Therefore, it is possible for the subject tracking moving image generation system S to generate a subject tracking moving image reliably.

Furthermore, the image processing unit 53 controls to execute selective clipping processing during continuously photographing a moving subject by the plurality of image capture units 16 and sequentially selects moving image data including the subject-included area at each timing during photography of the moving subject while controlling to sequentially clip images within the subject-included area from the moving image thus sequentially selected.

With such a configuration, since the images in the subject-included area are sequentially clipped from the moving images thus sequentially selected in the subject tracking moving image generation system S, it is possible to generate a subject tracking moving image in real time.

Furthermore, the subject tracking moving image generation system S includes: a plurality of image capture apparatuses 2 including the image capture unit 16; and the image capture control unit 1 including the image acquisition unit 52, the image processing unit 53, and the moving image generation unit 54.

With such a configuration, it is acceptable so long as the subject tracking moving image generation system S includes an image capture function at the image capture apparatus 2, whereby it is possible to generate a subject tracking moving image without especially including a function of a specific subject moving image generation.

Third Embodiment

In the second embodiment, it is configured so that a dedicated image capture control apparatus sequentially switches image capturing of the image capture apparatuses and performs clipping and coupling of the captured images acquired from the image capture apparatus, thereby generating a moving image.

On the other hand, in the present embodiment, it is configured so that each image capture apparatus communicates with each other to determine an image capture apparatus performing photographing without a dedicated image capture control apparatus, so as to cause only an image capture apparatus contributing to the generation of a moving image to sequentially switch and image capture.

Furthermore, in the present embodiment, it is configured so as to perform clipping by an image capture apparatus that performs photographing, transfer to an apparatus performing display of a moving image (a display apparatus), and sequentially display captured images acquired and clipped at the display apparatus, thereby replaying a moving image.

In the explanation of the third embodiment, since the hardware configurations of an image capture control apparatus and a photography apparatus are similar to those of the first embodiment, explanations thereof are omitted. Furthermore, explanations for the other configurations similar to those of the first embodiment are also omitted.

Figure 10:
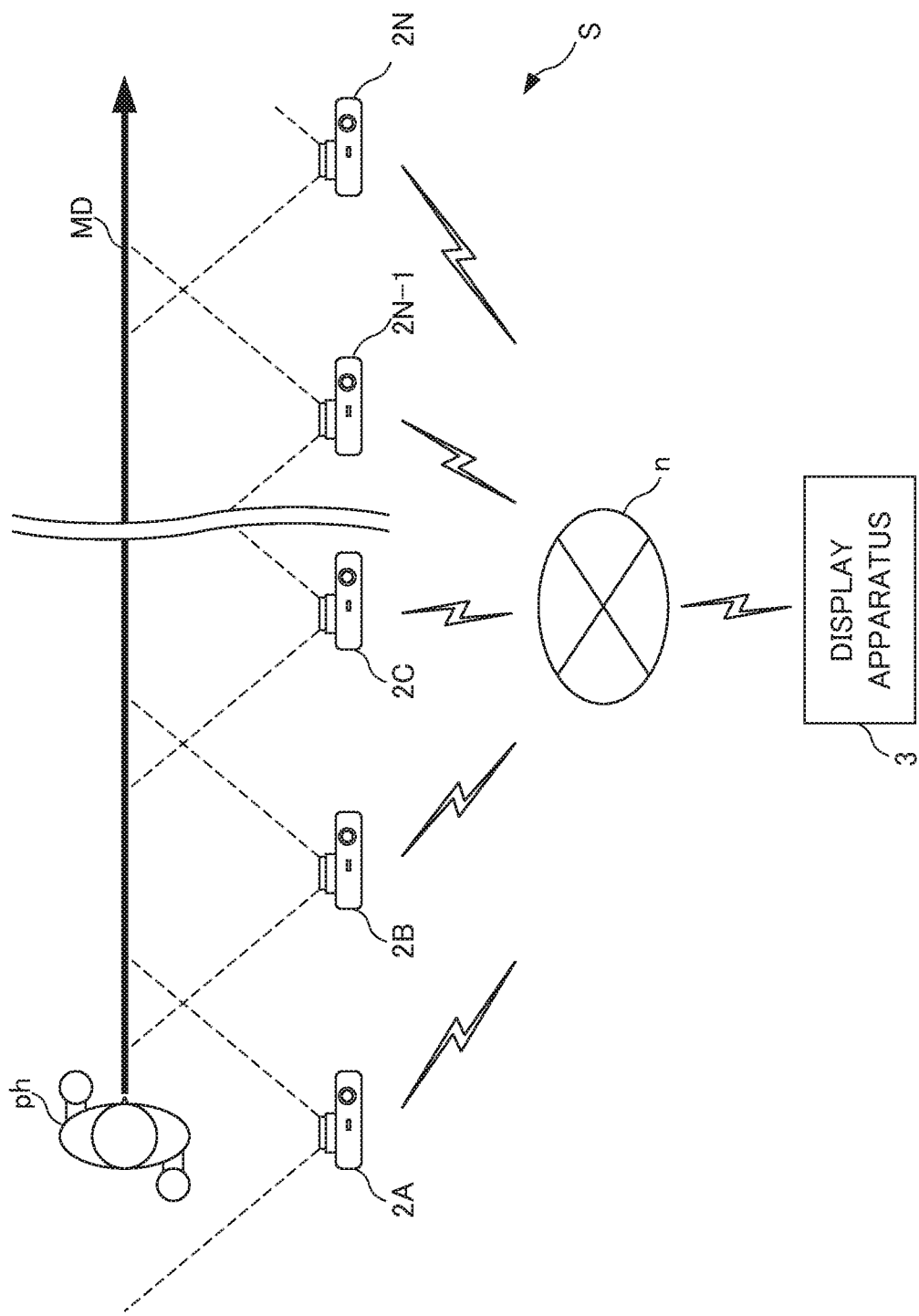
FIG. 10 is a system configuration diagram showing a system configuration of a subject tracking moving image generation system of a third embodiment.

FIG. 10 is a system configuration diagram showing a system configuration of a subject tracking moving image generation system S of a third embodiment.

As shown in FIG. 10, the subject tracking moving image generation system S of the third embodiment includes a plurality of image capture apparatuses 2A to 2N that can communicate with each other via a network n, and a display apparatus 3 that can communicate with an image capture apparatus 2 via the network n.

With the image capture apparatus 2, frame images are clipped and processed from a photographed moving image photographed and a constitutive frame image in which a specific subject is positioned at the center is generated. With the image capture apparatus 2, the frame images thus generated are transmitted to the display apparatus 3.

With the display apparatus 3, replay display of a subject tracking moving image is performed based on the constitutive frame images transmitted from the image capture apparatus 2.

Figure 11:
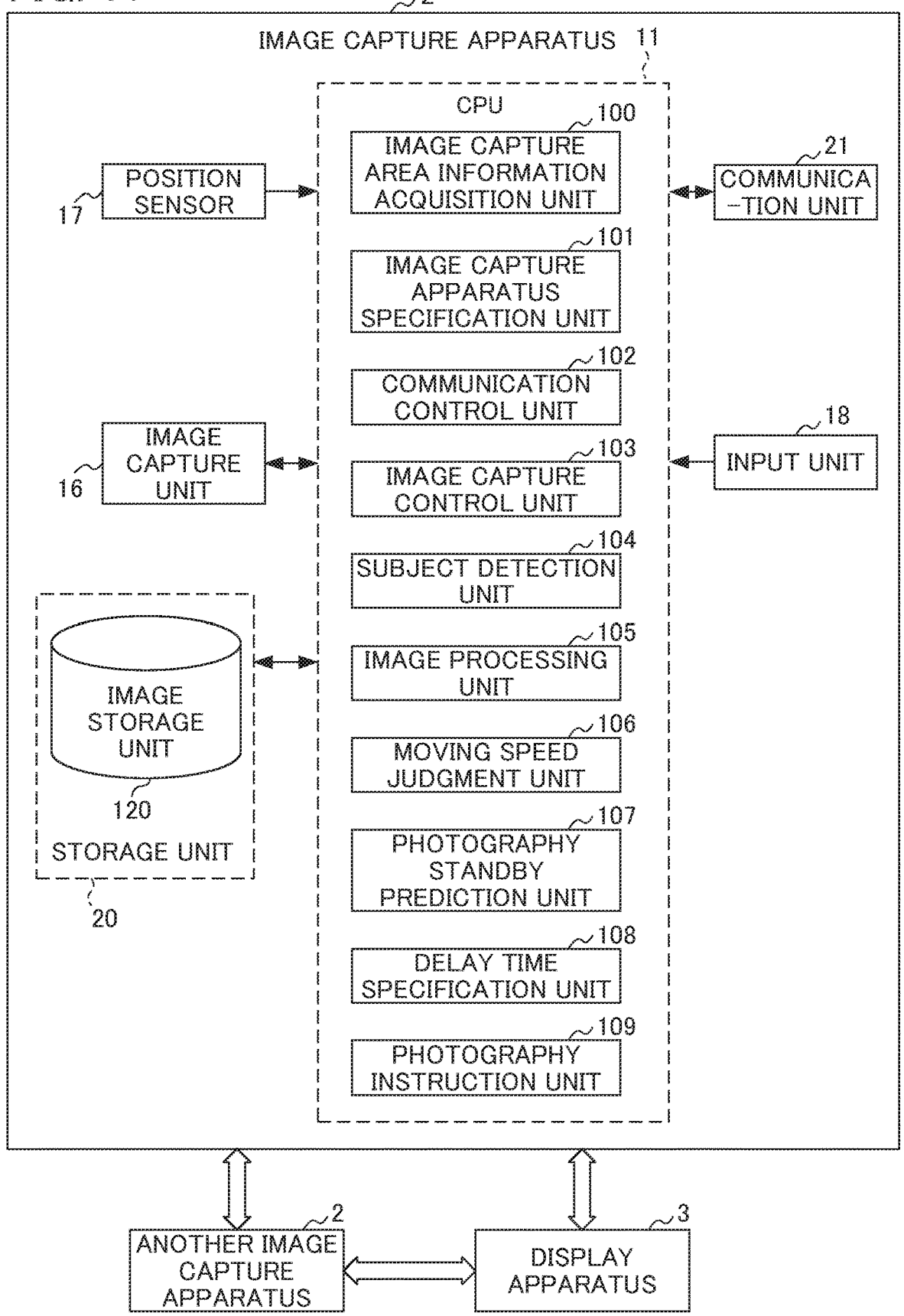
FIG. 11 is a functional block diagram showing a functional configuration for executing subject tracking moving image generation processing of a third embodiment, among the functional configurations of the image capture apparatus of FIG. 2.

FIG. 11 is a functional block diagram showing a functional configuration for executing subject tracking moving image generation processing in the third embodiment among the functional configurations of the image capture apparatus 2 of FIG. 2.

In a case of executing subject tracking moving image generation processing of the third embodiment, an image capture area information acquisition unit 100, an image capture apparatus specification unit 101, a communication control unit 102, an image capture control unit 103, a subject detection unit 104, an image processing unit 105, a moving speed judgment unit 106, a photography standby time prediction unit 107, a delay time specification unit 108, and a photography instruction unit 109 function in the CPU 11 of the image capture apparatus 2.

An image storing unit 120 is provided at an area of a storage unit 20.

Various image data such as constitutive frame images is stored in the image storing unit 120.

The image capture range information acquisition unit 100 acquires information such as a position, a direction, an angle of view, and the like, to be photographed by itself from a position sensor 17 (hereinafter, referred to as "photographing area information") and acquires photographing area information of another image capture apparatus 2 acquired by the position sensor 17 of the other image capture apparatus 2 via a communication unit 21.

The image capture apparatus specification unit 101 specifies a subsequent image capture apparatus 2 based on the photographing area information acquired by the image capture area information acquisition unit 100.

The communication control unit 102 judges whether there was an instruction to start photographing from another image capture apparatus 2 via the communication unit 21.

Furthermore, the communication control unit 102 transmits a constitutive frame image generated by the image processing unit 105 to the display apparatus 3.

The image capture control unit 103 controls the image capture unit 16 to start and end photographing based on an operation to instruct starting and ending photographing by a user on the input unit 18 or an instruction to start and end photographing from another image capture apparatus 2.

The subject detection unit 104 detects a subject included in a photographed moving image captured. Furthermore, the subject detection unit 104 judges whether a photographed target is included in a specific subject detected.

The image processing unit 105 clips image areas with a predetermined size of a specific subject at the center from current photographed images in which the specific subject exist so as to generate a constitutive frame image.

The moving speed judgment unit 106 judges a moving speed of the specific subject. More specifically, the moving speed judgment unit 106 analyses a moving image thus photographed to judge the moving speed of the specific subject from a difference between each frame image, for example.

The photography standby time prediction unit 107 calculates a standby time until when an image area that contributes to a subject tracking moving image can be clipped by the subsequent image capture apparatus 2, i.e. a waiting time until when photography of the subsequent image capture apparatus 2 starts (hereinafter, referred to as "photography start standby time").

Furthermore, the photography standby time prediction unit 107 calculates a standby time until when the image area that contributes to the subject tracking moving image is no longer clipped by the current image capture apparatus 2, i.e. a standby time until when photography of the current image capture apparatus 2 ends (hereinafter, referred to as "photography end standby time").

The photography start standby time of the subsequent image capture apparatus 2 is calculated based on an arrival time at a starting edge where photography starts in a photographing area of a subsequent photography apparatus 2 from an original position of a specific subject predicted based on a moving speed, for example.

In other words, the photography start standby time can be calculated with "Photography Start Standby Time of Subsequent Image Capture Apparatus 2=Distance to Starting Edge of Photographing Area of Subsequent Image Capture Apparatus 2 from Original Position of Specific Subject/Moving Speed of Specific Subject".

Here, for example, the original position of the specific subject can be calculated from a distance between positional information acquired from the position sensor 17 of image capture apparatus 2 and the specific subject as an absolute position. Furthermore, regarding a photographing area, an absolute position of an area from the starting edge to an ending edge can be found based on a distance between the positional information acquired from the position sensor 17 of the image capture apparatus 2 and a specific subject specified from a route along which the specific subject is supposed to move.

It should be noted that the photography start standby time can also be calculated by subtracting an overlapped portion with the subsequent image capture apparatus 2 from the ending edge of the photographing area of the current image capture apparatus 2.

The photography end standby time of the current image capture apparatus 2 is calculated based on an arrival time at the ending edge where photography ends in a photographing area of a current photography apparatus, from an original position of a specific subject predicted based on a moving speed.

In other words, the photography end standby time can be calculated with "Photography End Standby Time of Current Image Capture Apparatus 2=Distance to Ending Edge of Photographing Area of Current Image Capture Apparatus 2 from Original Position of Specific Subject/Moving Speed of Specific Subject".

The delay time specification unit 108 specifies a time required for switching photographing to the subsequent image capture apparatus 2 (hereinafter, referred to as "delay time") in consideration of an operation time from instructing to photograph until photographing due to the communication of the subsequent image capture apparatus 2, performance of the subsequent image capture apparatus 2, or the like.

By instructing to photograph by adding the delay time to the time to start photographing, with the image capture apparatus 2 that receives the instruction, since a preparation period for photography is provided, it is possible to adjust the apparatus or the like, a result of which it becomes possible to photograph with a stable condition.

The photography instruction unit 109 instructs the subsequent image capture apparatus 2 to start photographing based on a photography standby time (a photography end standby time and a photography start standby time) and the delay time. Furthermore, the photography instruction unit 109 instructs the subsequent image capture apparatus 2 to end photographing based on a standby time. Furthermore, the photography instruction unit 55 includes photographic conditions upon instructing to start and end photographing.

It should be noted that, in the present embodiment, it is configured so that the constitutive frame image is generated in the image capture apparatus 2 and transmitted to the display apparatus 3, and the constitutive frame image is displayed in the order of temporal sequence so as to output and display a subject tracking moving image by the display apparatus 3; however, it is not to be limited thereto. In the image capture apparatus 2, it may be configured to generate the subject tracking moving image and then to transmit to the display apparatus 3, or it may be configured to transmit to the display apparatus 3 in a state of a captured image, a clipped image, a composite image, or the like, and then to perform clipping processing in the display apparatus 3 so as to generate a constitutive frame image.

Figure 12:
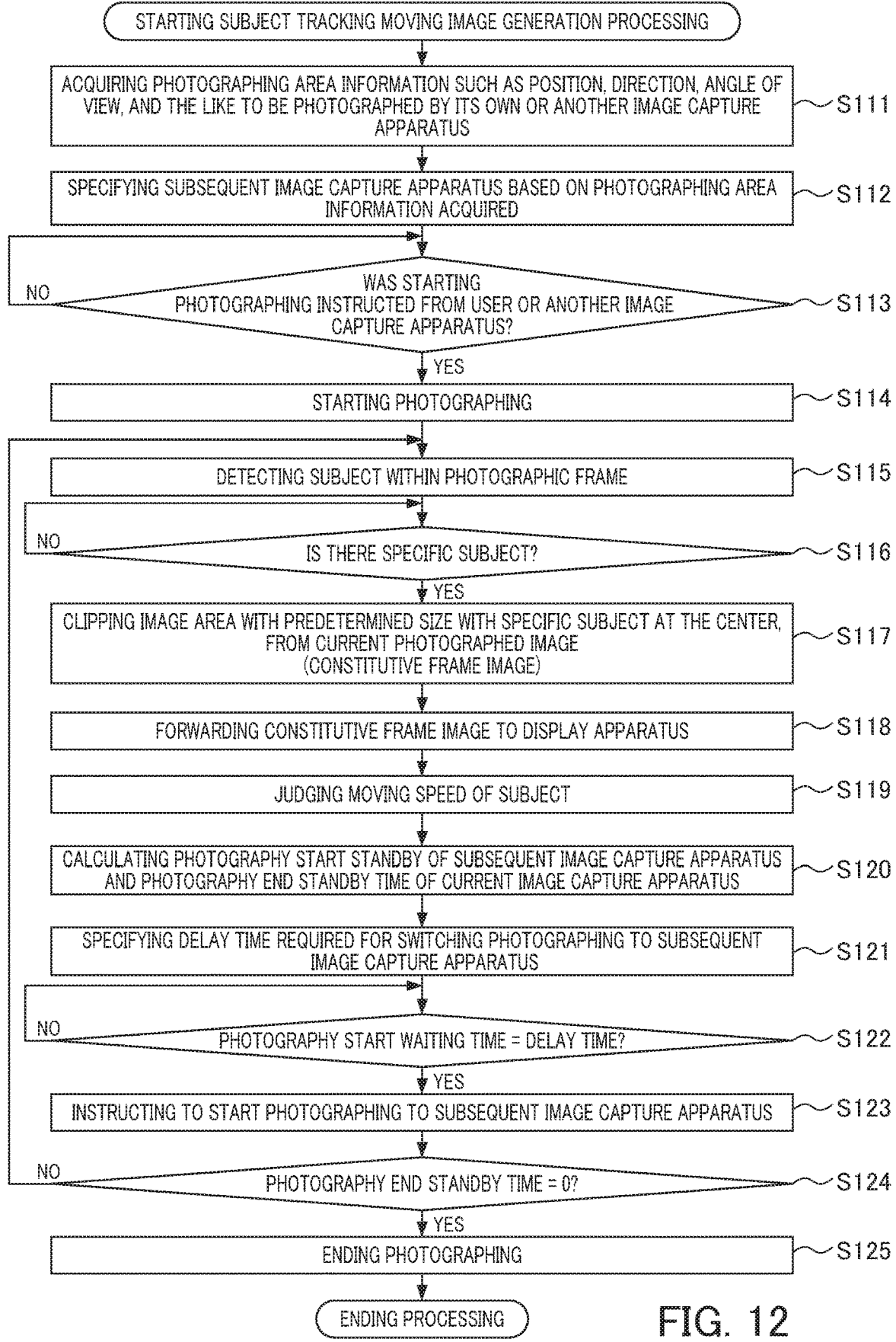
FIG. 12 is a flowchart showing a flow of subject tracking moving image processing of a third embodiment executed by the image capture apparatus of FIG. 2 having the functional configuration of FIG. 11.

FIG. 12 is a flowchart illustrating a flow of subject tracking moving image processing of the third embodiment executed by the image capture apparatus 2 of FIG. 2 having the functional configuration of FIG. 11.

In Step S111, the image capture area information acquisition unit 100 acquires photographing area information such as a position, a direction, an angle of view, and the like to be photographed by its own image capture apparatus 2 and another image capture apparatus 2.

In Step S112, the image capture apparatus specification unit 101 specifies a subsequent image capture apparatus 2 based on the photographing area information thus acquired.

In Step S113, the communication control unit 102 judges whether starting photographing was instructed from a user or another image capture apparatus 2.

In a case in which starting photographing was not instructed from the user or the other image capture apparatus 2, it is judged as NO in Step S113, and it enters a standby state.

In a case in which starting photographing was instructed from the user or another image capture apparatus 2, it is judged as YES in Step S113, and the processing advances to Step S114.

In Step S114, the image capture control unit 103 controls the image capture unit 16 to start photographing.

In Step S115, the subject detection unit 104 detects a subject within a photographing frame.

In Step S116, the subject detection unit 104 judges whether a specific subject exists.

In a case in which the specific subject does not exist, it is judged as NO in Step S116, and it enters a standby state.

In a case in which the specific subject exists, it is judged as YES in Step S116, and the processing advances to Step S117.

In Step S117, the image processing unit 105 generates a constitutive frame image by clipping an image area of a predetermined size with the specific subject at the center from current photographed images.

In Step S118, the communication control unit 102 forwards the constitutive frame image to the display apparatus 3.

In Step S119, the moving speed judgment unit 106 judges a moving speed of the subject.

In Step S120, the photography standby time prediction unit 107 calculates a photography start standby time of a subsequent image capture apparatus 2 and a photography end standby time of a current image capture apparatus 2.

In Step S121, the delay time specification unit 108 specifies a delay time required for switching photographing to the subsequent image capture apparatus 2.

In Step S122, the photography instruction unit 109 judges whether the photography start standby time of the subsequent image capture apparatus 2 is equal to the delay time thereof (photography start standby time=delay time).

In a case in which the delay time of the subsequent image capture apparatus 2 is shorter than the photography start standby time thereof, it is judged as NO in Step S122 and it enters a standby state.

In a case in which the delay time of the subsequent image capture apparatus 2 is equal to the photography start standby time thereof, it is judged as YES in Step S122, and the processing advances to Step S123.

In Step S123, the photography instruction unit 109 instructs the subsequent image capture apparatus 2 to instruct to start photographing. The photography instruction unit 109 instructs information such as photographic conditions and the like, as well as instructing to start photographing.

In Step S124, the photography instruction unit 109 judges whether the photography end standby time of the current image capture apparatus 2 is zero (photography end standby time of current image capture apparatus 2=0).

In a case in which the photography end standby time of the current image capture apparatus 2 is not zero, it is judged as NO in Step S124, and the processing returns to Step S115.

In a case in which the photography end standby time of the current image capture apparatus 2 is zero, it is judged as YES in Step S124, and the processing advances to Step S125.

In Step S125, the photography instruction unit 109 instructs the current image capture apparatus 2 to end photographing. Then, it ends the subject tracking moving image generation processing.

The subject tracking moving image generation system S with such a configuration includes the photography instruction unit 55.

The photography instruction unit 55 sequentially selects the image capture units 16 that are photographing a moving image including a subject-included area at each timing while a subject is moving.

The image processing unit 53 executes selective clipping processing by sequentially acquiring a moving image from the image capture unit 16 sequentially selected by the photography instruction unit 55.

With such a configuration, it is possible to acquire the moving image photographed at an appropriate image capture unit 16 with the subject tracking moving image generation system S.

It includes the image capture control unit 91 that, at each timing while the subject is moving, sequentially selects a photographing means to start or end photographing a moving image including a subject-included area, and controls to start or end photographing the moving image by way of the photographing means that is sequentially selected.

With such a configuration, it is possible to include a configuration so as not to perform unnecessary photography in the subject tracking moving image generation system S.

It should be noted that the present invention is not to be limited to the aforementioned embodiment, and that modifications, improvements, etc. within a scope that can achieve the object of the present invention are also included in the present invention.

Furthermore, in the subject tracking moving image generated, although a moving image in which a specific subject is included at a predetermined position with a predetermined size is generated in the abovementioned embodiments, the present invention is not limited thereto. It may be configured so that only a position within a moving image of a specific subject is always positioned at a predetermined position or only a size within a moving image of a specific subject is always a predetermined size.

Furthermore, in the subject tracking moving image generated, although a moving image of an angle of view in which a specific subject is always positioned at the center in the abovementioned embodiments, the present invention is not limited thereto. A moving image may be configured so that a position of a specific subject therein is constant through a subject tracking moving image, or may be configured so that a position of a specific subject therein is changed according to a desired effect such as a movement toward or away from a specific subject.

Furthermore, although the abovementioned embodiments may be configured with the image capture control apparatus 1 which does not perform photographing and each image capture apparatus 2, the present invention is not limited thereto.

For example, it may be configured so that another image capture apparatus 2 performs photographing based on control by the image capture apparatus 2 performing photographing. In other words, the subject tracking moving image generation system S may be configured with a main image capture apparatus 2 (main machine) and a sub image capture apparatus 2 (sub machine).

More specifically, the subject tracking moving image generation system S may be configured so that one among a plurality of the image capture apparatuses 2 serves as an image capture control apparatus, and so as to include a photography instruction means to select another image capture apparatus 2 and perform an instruction on the other image capture apparatus 2. In other words, it can be configured so that the image capture apparatus 2 including the image capture unit 16 also serves as a function of an image capture control apparatus.

With such a configuration, the subject tracking moving image generation system S can generate a subject tracking moving image with only the image capture apparatus 2, without a dedicated machine that controls photographing such as the image capture control apparatus 1.

Furthermore, in the abovementioned embodiment, the clipping processing may be configured so as to be performed at a side of the image capture apparatus 2 or at a side of the image capture control apparatus 1.

Furthermore, although a portion that contributes to a moving image is clipped and processed in the abovementioned embodiments, the present invention is not limited thereto. For example, it may be configured so as to acquire a background image in which a subject, etc. as a photographed target is not photographs, and composite the subject as a photographed target. By using an image thus processed, it is possible to generate a moving image that does not include a subject other than the subject as a photographed target, for example.

More specifically, in the subject tracking moving image generation system S, for example, it can be configured so that the moving image generation means such as the moving image generation unit 54 generates a moving image by coupling in the order of photography, while performing compositing by attaching, to a predetermined static image, a plurality of images that are selectively clipped according to each timing by way of the selective clipping processing.

Furthermore, although it is controlled to perform photographing by detecting or predicting that a subject as a photographed target is photographed in the abovementioned embodiments, the present invention is not limited thereto.

For example, it may also be configured so as to perform photographing by neighboring image capture apparatuses prior or after an image capture apparatus that is photographing a subject without detecting a subject and the like. With such a configuration, it is possible to process by clipping with images photographed in a state in which the subject is positioned at the center and images photographed in a state in which the subject is moving toward or away from the center.

FIG. 13 is a diagram showing another example of photography timing.

As illustrated in the example of FIG. 13, regarding the photography timing, at the time of starting photographing, since a subject is positioned at the center and moves away from the center, it is possible to generate a clipped image with images photographed by the image capture apparatus 2A and the image capture apparatus 2B. Furthermore, in a case of photographing the subject with the image capture apparatus 2B subsequent to the image capture apparatus 2A, photography is conducted with three apparatuses including the image capture apparatus 2A, the image capture apparatus 2B, and the image capture apparatus 2C. In a case of photographing with the image capture apparatus 2B, since the subject moves toward the center, is positioned at the center, and moves away from the center, it is possible to generate a clipped image with images photographed by the image capture apparatus 2A, the image capture apparatus 2B, and the image capture apparatus 2C. In a case of photographing a subject with the image capture apparatus 2C, similarly to the case of photographing with the image capture apparatus 2B, it is possible to generate a clipped image with images photographed by the image capture apparatus 2B prior or after the image capture apparatus 2C and the image capture apparatus 2D.

In addition, although a predetermined area including a specific subject refers to an image area for clipping in the abovementioned embodiments, the present invention is not limited thereto. For example, it may be configured so that an area corresponding to a shape of a specific subject, i.e. an area of a specific subject, is set to be an image area for clipping.

More specifically, the clipping means such as the image processing unit 53 and the like can be configured so as to clip only an area corresponding to a shape of a subject from an image area of which the shape corresponds to the shape of the subject.

Furthermore, although it is configured so as to generate a constitutive frame image from a photographed moving area in the abovementioned embodiment, the present invention is not limited thereto and, for example, it may be configured so as to generate a constitutive frame image using captured images photographed at a predetermined timing.

Furthermore, although it is configured so as to transmit photographed images or a constitutive frame image to an apparatus that generates a moving image from each image capture apparatus 2 in the abovementioned embodiment, the present invention is not limited thereto, and it may be configured so as to transmit a photographed moving image and generate a constitutive frame image from photographed images received.

Furthermore, although it is configured so as to photograph a photographed moving image by a plurality of image capture apparatuses 2 in the abovementioned embodiment, the present invention is not limited thereto, and it may be configured so as to have a plurality of image capture means at a single apparatus and to generate a subject tracking moving image based on images acquired from the image capture means.

In the aforementioned embodiments, the digital camera has been described as an example of the image capture apparatus 2 to which the present invention is applied, but the present invention is not limited thereto in particular.

For example, the present invention can be applied for general electronic apparatuses having the subject tracking moving image generation processing function. More specifically, for example, the present invention can be applied to a lap-top personal computer, a printer, a television, a video camera, a portable navigation device, a smart phone, a cell phone device, a smart phone, a portable gaming device, and the like.

The processing sequence described above can be executed by hardware, and can also be executed by software.

In other words, the hardware configuration shown in FIGS. 3, 7, and 11 is merely an illustrative example, and the present invention is not particularly limited thereto. More specifically, the types of functional blocks employed to realize the above-described functions are not particularly limited to the example shown in FIGS. 3, 7, and 11, so long as the image capture apparatus 2 can be provided with the functions enabling the aforementioned processing sequence to be executed in its entirety.

A single functional block may be configured by a single piece of hardware, a single installation of software, or any combination thereof.

In a case in which the processing sequence is executed by software, a program configuring the software is installed from a network or a storage medium into a computer or the like.

The computer may be a computer embedded in dedicated hardware. Alternatively, the computer may be a computer capable of executing various functions by installing various programs, e.g., a general-purpose personal computer.

The storage medium containing such a program can not only be constituted by the removable medium 31 shown in FIG. 2 distributed separately from the device main body for supplying the program to a user, but also can be constituted by a storage medium or the like supplied to the user in a state incorporated in the device main body in advance. The removable medium 31 is composed of, for example, a magnetic disk (including a floppy disk), an optical disk, a magnetic optical disk, or the like. The optical disk is composed of, for example, a CD-ROM (Compact Disk-Read Only Memory), a DVD (Digital Versatile Disk), or the like. The magnetic optical disk is composed of an MD (Mini-Disk) or the like. The storage medium supplied to the user in a state incorporated in the device main body in advance may include, for example, the ROM 12 shown in FIG. 2, a hard disk included in the storage unit 20 shown in FIG. 2 or the like, in which the program is recorded.

It should be noted that, in the present specification, the steps describing the program recorded in the storage medium include not only the processing executed in a time series following this order, but also processing executed in parallel or individually, which is not necessarily executed in a time series.

In addition, in the present specification, a term system shall mean a general device configured from a plurality of devices, a plurality of means, and the like.

What is claimed is:

1. An image transmission system comprising:
    a plurality of image capture apparatuses each comprising an image capture unit and a CPU;
    wherein the CPU of one of the image capture apparatuses is configured to:
    identify the one of the image capture apparatuses in which the CPU is provided as a current image capture apparatus, and identify another one of the image capture apparatuses as a subsequent image capture apparatus to take over image capturing from the current image capture apparatus, based on respective different photographing areas of the plurality of image capture apparatuses;
    control the current image capture apparatus to capture a plurality of images of the photographing area of the current image capture apparatus;
    detect a moving subject in the captured images;
    select, from the captured images, a captured image having a subject-included area that is a partial image area in which the detected moving subject is included at a predetermined position or in a predetermined size, and execute selective clipping processing that clips an image within the subject-included area from the selected captured image;
    transmit the clipped image to an external apparatus;
    determine a moving state of the detected moving subject in the captured images;
    determine a start timing for the subsequent image capture apparatus to begin capturing images based on (i) the determined moving state of the detected moving subject and (ii) the photographing area of the subsequent image capture apparatus; and
    instruct the subsequent image capture apparatus to start image capturing at the determined start timing.

2. The image transmission system according to claim 1, wherein the subject-included area is a partial image area in which the detected moving subject is included at the center of a captured image at a predetermined size.

3. The image transmission system according to claim 1, wherein the plurality of image capture apparatuses are arranged such that the photographing areas of adjacent image capture apparatuses at least partially overlap along a moving path of the moving subject.

4. The image transmission system according to claim 1, wherein the CPU is further configured to:
    determine an end timing at which to end image capturing by the current image capture apparatus, based on (i) the determined moving state of the specific detected moving subject, and (ii) the photographing area of the current image capture apparatus; and
    instruct the current image capture apparatus to end image capturing at the determined end timing.

5. The image transmission system according to claim 4, wherein the CPU determines the start timing for the subsequent image capture apparatus and the end timing for the current image capture apparatus so that the end timing arrives at a time after a predetermined time from the start timing.

6. The image transmission system according to claim 1, wherein:
    the determined moving state of the detected moving subject is a moving speed of the detected moving subject; and
    the CPU determines the start timing based on the moving speed of the detected moving subject and a time to reach the photographing area of the subsequent image capture apparatus from an original position of the detected moving subject.

7. The image transmission system according to claim 1, wherein the CPU is further configured to:
    specify a delay time corresponding to an operating time required by the subsequent image capture apparatus to begin image from a time of receiving an instruction to begin image capturing; and
    instructs the subsequent image capture apparatus to begin image capturing at the determined start timing by transmitting, to the subsequent image capture apparatus, information of the start timing at a timing not later than the delay time with respect to the start timing.

8. The image transmission system according to claim 7, wherein the CPU transmits the information of the start timing by transmitting an instruction signal to start image capturing to the subsequent image capture apparatus.

9. The image transmission system according to claim 1, wherein the CPU is further configured to:

transmit, to the subsequent image capture apparatus, photographing conditions of the current image capture apparatus.

10. The image transmission system according to claim 1, wherein CPU determines the start timing such that the subsequent image capture apparatus can capture images of the detected moving subject.

11. The image transmission system according to claim 1, wherein the CPU performs composition by attaching to a predetermined static image, the plurality of selectively clipped images according to each timing in the photography by way of the clipping, and transmits each of the composited images to the external apparatus.

12. The image transmission system according to claim 1, wherein the CPU clips only an image area corresponding to a shape of the detected moving subject in the selective clipping processing.

13. The image transmission system according to claim 1, wherein a dedicated image capture control apparatus is not included in the system;
   wherein each of the plurality of the image capture apparatuses further comprises a communication unit; and
   wherein the CPU of the one of the image capture apparatuses is further configured to:
      sequentially select image capture apparatuses such that the photographing area of the selected image capture apparatus includes the moving subject by controlling the communication unit so that the image capture apparatuses communicate with each other; and
      cause only the selected image capture apparatus to perform image capturing.

14. The image transmission system according to claim 1, wherein the external apparatus comprises a display unit which displays an image; and
   wherein the external apparatus configured to:
      receive a plurality of clipped images from the plurality of image capture apparatuses;
      couple the received images in order of image capturing time so as to generate a single moving image; and
      display the generated single moving image on the display.

15. The image transmission system according to claim 1, wherein at the determined start timing, the CPU of the subsequent image capture apparatus controls the subsequent image capture apparatus to begin image capturing, and the CPU of the subsequent image capture apparatus performs the same processing as the CPU of said one of the image capture apparatuses.

16. An image transmission method for an image transmission system including a plurality of image capture apparatuses each comprising an image capture unit, the method comprising:
   selecting one of the image capture apparatuses as a current image capture apparatus;
   identifying another one of the image capture apparatuses as a subsequent image capture apparatus to take over image capturing from the current image capture apparatus, based on respective different photographing areas of the plurality of image capture apparatuses;
   controlling the current image capture apparatus to capture a plurality of images of the photographing area of the current image capture apparatus;
   detecting a moving subject in the captured images;
   selecting, from the captured images, a captured image having a subject-included area that is a partial image area in which the detected moving subject is included at a predetermined position or in a predetermined size, and executing selective clipping processing that clips an image within the subject-included area from the selected captured image;
   transmitting the clipped image to an external apparatus;
   determining a moving state of the detected moving subject in the captured images;
   determining a start timing for the subsequent image capture apparatus to begin capturing images based on (i) the determined moving state of the detected moving subject and (ii) the photographing area of the subsequent image capture apparatus; and
   instructing the subsequent image capture apparatus to start image capturing at the determined start timing.

17. A non-transitory storage medium encoded with a computer-readable program that enables a computer controlling an image capture apparatus included in an image transmission system having a plurality of image capture apparatuses to execute functions including:
   identifying the image capture apparatus controlled by the computer as a current image capture apparatus;
   identifying another one of the image capture apparatuses in the image transmission system as a subsequent image capture apparatus to take over image capturing from the current image capture apparatus, based on respective different photographing areas of the plurality of image capture apparatuses;
   controlling the current image capture apparatus to capture a plurality of images of the photographing area of the current image capture apparatus;
   detecting a moving subject from a plurality of moving in the captured images;
   selecting, from the captured images, a captured image having a subject-included area that is a partial image area in which the detected moving subject is included at a predetermined position or in a predetermined size, and executing selective clipping processing that clips an image within the subject-included area from the selected captured image;
   transmitting the clipped image to an external apparatus;
   determining a moving state of the detected moving subject in the captured images;
   determining a start timing for the subsequent image capture apparatus to begin capturing images based on (i) the determined moving state of the detected moving subject and (ii) the photographing area of the subsequent image capture apparatus; and
   instructing the subsequent image capture apparatus to start image capturing at the determined start timing.

* * * * *

UNITED STATES PATENT AND TRADEMARK OFFICE
CERTIFICATE OF CORRECTION

PATENT NO. : 10,536,648 B2
APPLICATION NO. : 15/843051
DATED : January 14, 2020
INVENTOR(S) : Koki Nakamura et al.

It is certified that error appears in the above-identified patent and that said Letters Patent is hereby corrected as shown below:

Page 1 of 1

In the Claims

Column 24, Line 29, after "the" delete "specific".

Column 25, Line 5, after "wherein" insert --the--.

Column 26, Line 40, after "subject" delete "from a plurality of moving".

Signed and Sealed this
Fifth Day of May, 2020

Andrei Iancu
*Director of the United States Patent and Trademark Office*